US011222249B2

(12) United States Patent
Kaehr et al.

(10) Patent No.: US 11,222,249 B2
(45) Date of Patent: Jan. 11, 2022

(54) OPTICALLY CONFIGURABLE CHARGE-TRANSFER MATERIALS AND METHODS THEREOF

(71) Applicants: National Technology & Engineering Solutions of Sandia, LLC, Albuquerque, NM (US); Joseph J. Reczek, New Albany, OH (US)

(72) Inventors: Bryan James Kaehr, Albuquerque, NM (US); Joseph J. Reczek, New Albany, OH (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 0 days.

(21) Appl. No.: 17/234,959

(22) Filed: Apr. 20, 2021

(65) Prior Publication Data

US 2021/0256335 A1 Aug. 19, 2021

Related U.S. Application Data

(62) Division of application No. 16/200,413, filed on Nov. 26, 2018, now Pat. No. 11,010,651.

(51) Int. Cl.
*G06K 19/06* (2006.01)
*C09K 19/38* (2006.01)
*G06K 19/02* (2006.01)
*G02F 1/1333* (2006.01)

(52) U.S. Cl.
CPC ...... *G06K 19/0615* (2013.01); *C09K 19/3804* (2013.01); *G02F 1/133362* (2013.01); *G06K 19/02* (2013.01); *G06K 19/022* (2013.01); *G06K 19/06037* (2013.01)

(58) Field of Classification Search
CPC .. G06K 19/0615; G06K 19/02; G06K 19/022; G06K 19/06037; C09K 19/3804; G02F 1/133362
USPC ......................................................... 235/494
See application file for complete search history.

(56) References Cited

U.S. PATENT DOCUMENTS

| | | |
|---|---|---|
| 5,288,986 A | 2/1994 | Pine et al. |
| 5,296,321 A | 3/1994 | Kawanishi et al. |
| 5,726,435 A | 3/1998 | Hara et al. |
| 5,920,062 A | 7/1999 | Williams |
| 5,992,748 A | 11/1999 | Takahashi et al. |
| 6,267,296 B1 | 7/2001 | Ooshima et al. |
| 6,318,633 B1 | 11/2001 | Drexler |
| 6,419,987 B1 | 7/2002 | Bauer et al. |
| 6,550,685 B1 | 4/2003 | Kindberg |
| 6,752,316 B2 | 6/2004 | Mizoguchi |

(Continued)

FOREIGN PATENT DOCUMENTS

WO  WO 97/43289 A1  11/1997

OTHER PUBLICATIONS

U.S. Appl. No. 15/217,582, filed Jul. 22, 2016, Kaehr et al.

(Continued)

*Primary Examiner* — Daniel A Hess
(74) *Attorney, Agent, or Firm* — Kevin W. Bieg

(57) ABSTRACT

The present invention relates to an optical code including a film of a charge-transfer material, as well as methods thereof. Described herein are optical codes having anisotropic and/or isotropic regions within the film, which can be provided in a pattern that serves as an optical code.

11 Claims, 11 Drawing Sheets

(56) References Cited

U.S. PATENT DOCUMENTS

| | | | |
|---|---|---|---|
| 7,198,194 | B2 | 4/2007 | Kim et al. |
| 7,619,607 | B2 | 11/2009 | Zhang et al. |
| 7,648,072 | B2 | 1/2010 | Yada |
| 8,272,038 | B2 | 9/2012 | Husemann et al. |
| 8,573,499 | B1 | 11/2013 | Boyle |
| 8,859,190 | B1 | 10/2014 | Dirk et al. |
| 9,273,305 | B1 | 3/2016 | Kaehr et al. |
| 9,594,937 | B2 | 3/2017 | Johansen et al. |
| 9,911,072 | B2 | 3/2018 | Hosokane |
| 9,970,000 | B2 | 5/2018 | Kaehr et al. |
| 9,989,447 | B1 | 6/2018 | Kaehr et al. |
| 11,010,651 | B1 * | 5/2021 | Kaehr .................. C09K 19/322 |
| 11,151,345 | B2 * | 10/2021 | Kaehr ................ C09K 19/3483 |
| 2006/0215913 | A1 | 9/2006 | Wang et al. |
| 2011/0155815 | A1 | 6/2011 | Jarvis et al. |
| 2013/0240627 | A1 | 9/2013 | Mamaladze et al. |
| 2018/0299357 | A1 | 10/2018 | Kaehr et al. |
| 2021/0165984 | A1 * | 6/2021 | Kaehr .................. G06K 7/1417 |
| 2021/0256335 | A1 * | 8/2021 | Kaehr ................ C09K 19/3804 |

OTHER PUBLICATIONS

U.S. Appl. No. 15/217,606, filed Jul. 22, 2016, Kaehr et al.
U.S. Appl. No. 15/282,511, filed Sep. 30, 2016, Kaehr.
U.S. Appl. No. 16/016,452, filed Jun. 22, 2018, Kaehr et al.
U.S. Appl. No. 16/016,466, filed Jun. 22, 2018, Pozin et al.
Alvey PM et al., "A systematic study of thermochromic aromatic donor-acceptor materials," *J. Org. Chem.* 2010;75:7682-90.
Bé AG et al., "Strongly dichroic organic films via controlled assembly of modular aromatic charge-transfer liquid crystals," *Org. Lett.* 2015;17:4834-7.
Bisoyi HK et al., "Light-driven liquid crystalline materials: from photo-induced phase transitions and property modulations to applications," *Chem. Rev.* 2016;116:15089-166.
Blaiszik BJ et al., "Self-healing polymers and composites," *Annu. Rev. Mater. Res.* 2010;40:179-211.
Boles MA et al., "Self-assembly of colloidal nanocrystals: from intricate structures to functional materials," *Chem. Rev.* 2016;116:11220-89.
Cai G et al., "Next-generation multifunctional electrochromic devices," *Acc. Chem. Res.* 2016;49:1469-76.
Chen QN et al., "Mechanisms of electromechanical coupling in strain based scanning probe microscopy," *Appl. Phys. Lett.* 2014;104:242907 (4 pp.).
Chigrinov VG, Kozenkov VM, Kwok HS, "Photoalignment of Liquid Crystalline Materials: Physics and Applications," (ed. A. C. Lowe), John Wiley & Sons (West Sussex, UK), 2008, pp. 78-81.
D'Avino G et al., "Conflicting evidence for ferroelectricity," *Nature* 2017;547:E9-E10.
Garai B et al., "Photochromic metal-organic frameworks for inkless and erasable printing," *Chem. Sci.* 2016;7:2195-200.
Grzelczak M et al., "Directed self-assembly of nanoparticles," *ACS Nano* 2010;4:3591-605.
Kaafarani BR, "Discotic liquid crystals for opto-electronic applications," *Chem. Mater.* 2011;23:378-96.
Kaehr B et al., "Direct-write optical polarizers built from charge-transfer liquid crystals," abstract for the Rio Grande Symposium on Advanced Materials held on Oct. 8, 2018 in Albuquerque, NM (2 pp.).
Kim S et al., "Electrostatic-free piezoresponse force microscopy," *Sci. Rep.* 2017;7:41657 (8 pp.).
Kumar S, "Chemistry of Discotic Liquid Crystals: From Monomer to Polymers," (ed. V. Percec), CRC Press (Boca Raton, FL), 2011, pp. 29-42.
Lampert CM, "Chromogenic smart materials," *Mater. Today* 2004;7:28-35.
Leight KR et al., "Predictable tuning of absorption properties in modular aromatic donoracceptor liquid crystals," *Chem. Mater.* 2012;24:3318-28.
Montelongo Y et al., "Reconfigurable optical assembly of nanostructures," *Nat. Commun.* 2016;7:12002 (8 pp.).
Morita Y et al., "Thermochromism in an organic crystal based on the coexistence of α- and π-dimers," *Nat. Mater.* 2008;7:48-51.
Nielson R et al., "Microreplication and design of biological architectures using dynamic-mask multiphoton lithography," *Small* 2009;5:120-5.
Qin Y et al., "Efficient ambipolar transport properties in alternate stacking donor-acceptor complexes: from experiment to theory," *Phys. Chem. Chem. Phys.* 2016;18:14094-103.
Reczek JJ et al, "Optically tunable, rewritable media from organic charge-transfer liquid crystalline films," Abstract for poster No. ES07.06.09 presented at the Material Research Society Fall Meeting held on Nov. 26-Dec. 1, 2017 in Boston, Massachusetts (1 p.).
Reczek JJ et al., "Tunable columnar mesophases utilizing $C_2$ symmetric aromatic donor-acceptor complexes," *J. Am. Chem. Soc.* 2006;128:7795-8002.
Reczek JJ, "Aromatic electron donor-acceptor interactions in novel supramolecular assemblies," *Ph.D. dissertation, University of Texas, Austin*, 2006 (205 pp.).
Sarman S et al., "Director alignment relative to the temperature gradient in nematic liquid crystals studied by molecular dynamics simulation," *Phys. Chem. Chem. Phys.* 2014;16:14741-9.
Shin J et al., "Thermally functional liquid crystal networks by magnetic field driven molecular orientation," *ACS Macro Lett.* 2016;5:955-60.
Sonmez G et al., "Organic polymeric electrochromic devices: polychromism with very high coloration efficiency," *Chem. Mater.* 2004;16:574-80.
Srivastava AK et al., "Photoaligned nanorod enhancement films with polarized emission for liquid-crystal-display application," *Adv. Mater.* 2017;29:1701091 (6 pp.).
Su Y et al., "Donor-acceptor cocrystal based on hexakis(alkoxy)triphenylene and perylenediimide derivatives with an ambipolar transporting property," *Nanoscale* 2015;7:1944-55.
Tayi AS et al., "Room-temperature ferroelectricity in supramolecular networks of chargetransfer complexes," *Nature* 2012;488:485-9.
Van Winkle M et al., "Direct-write optical polarizers built from charge-transfer liquid crystals," presented at the Rio Grande Symposium on Advanced Materials held on Oct. 8, 2018 in Albuquerque, NM, *Sandia Report No. SAND2018-11444C* (19 pp.).
Van Winkle M et al., "Laser rewritable dichroics through reconfigurable organic charge-transfer liquid crystals," *Adv. Mater.* 2018;30:e1706787 (6 pp.).
Van Winkle M et al., Supporting Information for "Laser rewritable dichroics through Yeconfigurable organic charge-transfer liquid crystals," *Adv. Mater.* 2018;30:e1706787 (10 pp.).
Van Winkle M et al., "Optically reconfigurable charge-transfer liquid crystals," presented at the 255th American Chemical Society National Meeting and Exposition held on Mar. 18-22, 2018 in New Orleans, Louisiana (16 pp.).
Van Winkle et al., "Optically tunable, rewritable media from organic charge-transfer liquid crystalline films," Poster No. ES07.06.09 presented at the Material Research Society Fall Meeting held on Nov. 26-Dec. 1, 2017 in Boston, Massachusetts (1 p.).
Wang L et al., "Dynamic nanoparticle assemblies," *Acc. Chem. Res.* 2012;45:1916-26.
Wang W et al., "Photocatalytic colour switching of redox dyes for ink-free light-printable rewritable paper," *Nat. Commun.* 2014;5:5459 (7 pp.).
Wöhrle T et al., "Discotic liquid crystals," *Chem. Rev.* 2016;116:1139-241.
Yang Y et al., "Self-healing polymeric materials," *Chem. Soc. Rev.* 2013;42:7446-67.
Zheng ZG et al., "Light-patterned crystallographic direction of a self-organized 3D soft photonic crystal," *Adv. Mater.* 2017;29:1703165 (8 pp.).
Zhu L et al., "Prediction of remarkable ambipolar charge-transport characteristics in organic mixed-stack charge-transfer crystals," *J. Am. Chem. Soc.* 2012;134:2340-7.

* cited by examiner

Before bending | Bend to half circle (10x) | After bending

OPTICALLY CONFIGURABLE CHARGE-TRANSFER MATERIALS AND METHODS THEREOF

CROSS-REFERENCE TO RELATED APPLICATION

This application is a divisional of prior application Ser. No. 16/200,413, filed Nov. 26, 2018, which is hereby incorporated by reference in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to an optical code including a film of a charge-transfer material, as well as methods thereof. Described herein are optical codes having anisotropic and/or isotropic regions within the film, which can be provided in a pattern that serves as an optical code.

BACKGROUND OF THE INVENTION

Optically active, organic materials can provide unique assemblies for various applications, including use in coatings, films, electronics, and other nanoscale or microscale materials. Yet, tuning the responsiveness of such materials remain a challenge. In particular, there is a need for additional materials and processes to provide optically responsive materials.

SUMMARY OF THE INVENTION

The present invention, in part, relates to use of a charge-transfer material to develop an optical code that can be optically written, rewritten, and read. In particular, we describe a class of functional, optically writable and rewritable materials built from organic charge-transfer (CT) liquid crystals, as well as methods for treating such materials to provide an optically rewritable (OWR) material.

In a first aspect, the present invention features a code (e.g., an optical code) including: a film including a charge-transfer material, wherein the charge-transfer material includes a plurality of domains; and a pattern disposed within the film. In some embodiments, the pattern includes a plurality of first regions, wherein each of the plurality of first regions includes a first optically anisotropic phase (e.g., a phase including a plurality of aligned domains arranged in an aligned columnar phase characterized by a first columnar director). In further embodiments, the pattern further includes a plurality of second regions, wherein each of the second regions includes an optically isotropic phase including a plurality of domains lacking alignment along the first columnar director or a second optically anisotropic phase (e.g., a phase including a plurality of aligned domains arranged in an aligned columnar phase characterized by a second columnar director that is different than first columnar director).

In some embodiments, the optically isotropic phase (e.g., of the second regions) includes a melted region of the charge-transfer material. In other embodiments, the optically isotropic phase (e.g., of the second regions) includes an isotropic region of the charge-transfer material.

In some embodiments, the second optically anisotropic phase (e.g., of the second regions) includes the second columnar director that is orthogonal to the first columnar director.

In other embodiments, the pattern further includes a plurality of third regions. In some embodiments, each of the third regions includes a third optically anisotropic phase including a plurality of aligned domains arranged in an aligned columnar phase (e.g., characterized by a third columnar director that is different than the first columnar director and/or the second columnar director).

In a second aspect, the present invention features a method of writing an optical code, the method including: providing a film including a charge-transfer material (e.g., wherein the charge-transfer material includes a plurality of domains); thermally melting the film (e.g., by exposing the film to a first source, such as a first optical source) to provide a first pattern disposed within the film, in which the first pattern includes a plurality of first regions (e.g., any described herein, and/or second regions and/or third regions, such as any described herein); and optionally erasing by thermally melting the first pattern (e.g., by exposing first pattern to a second source, such as a second optical source). In one non-limiting embodiment, thermally melting includes optical (e.g., laser) generated thermal imaging. In yet another embodiment, thermally melting can include use of any useful thermal heat source, such as an optical source, a laser, a flash exposure source, a flash lamp, a heat lamp, a thermal heat stamp, etc.

In some embodiments, the thermally melting step including masking a portion of the film and exposing the film (e.g., to a thermal heat source, such as any described herein), thereby providing the first pattern. For instance, a mask (e.g., including regions to transmit heat or light, as well as regions to absorb or reflect heat or light) can be employed to cover portions of the film that should not be thermally melted. In some embodiments, the erasing step includes masking a portion of the film and exposing the film (e.g., to a thermal heat source, such as any described herein), thereby melting the first pattern. For instance, a mask (e.g., including regions to transmit heat or light, as well as regions to absorb or reflect heat or light) can be employed to expose portions of the film that should be thermally melted.

In a third aspect, the present invention features a method of writing an optical code, the method including: providing a film including a charge-transfer material (e.g., wherein the charge-transfer material includes a plurality of domains); exposing the film to a first source (e.g., a first optical source) to provide a first pattern disposed within the film, in which the first pattern includes a plurality of first regions (e.g., any described herein, and/or second regions and/or third regions, such as any described herein); and optionally erasing by exposing first pattern to a second source (e.g., a second optical source). In particular embodiments, the first and second sources (e.g., optical sources) can be same or different.

In some embodiments, the film includes an initial aligned columnar phase characterized by an initial columnar director. In further embodiments, each of the plurality of first regions includes a first optically anisotropic phase (e.g., including a plurality of aligned domains arranged in an aligned columnar phase characterized by a first columnar director that is different than the initial columnar director). In some embodiments, the exposing step and/or the thermally melting step provides alignment within the plurality of first regions. In some embodiments, the thermally melting step includes exposing the film to a thermal heat source or an optical source that is translated at a speed of from about 0.1 mm/s to about 1 mm/s. In other embodiments, the exposing step includes exposing the film to a thermal heat source or an optical source that is translated at a speed of from about 0.1 mm/s to about 1 mm/s. In particular embodiments, the thermal heat source (e.g., an optical source, such as the first optical source) is translated at a speed of from about 0.1 mm/s to about 1 mm/s. In yet other embodiments, the thermal heat source (e.g., an optical source, such as the first optical source) is translated at a speed of from about 0.01 mm/s to about 1 mm/s (e.g., from 0.01 mm/s to 0.1 mm/s, 0.01 mm/s to 0.2 mm/s, 0.01 mm/s to 0.5 mm/s, 0.01 mm/s to 0.8 mm/s, 0.05 mm/s to 0.1 mm/s, 0.05 mm/s to 0.2 mm/s, 0.05 mm/s to 0.5 mm/s, 0.05 mm/s to 0.8 mm/s, 0.05 mm/s to 1 mm/s, 0.1 mm/s to 0.2 mm/s, 0.1 mm/s to 0.5 mm/s, 0.1 mm/s to 0.8 mm/s, 0.1 mm/s to 1 mm/s, 0.2 mm/s to 0.5 mm/s, 0.2 mm/s to 0.8 mm/s, 0.2 mm/s to 1 mm/s, 0.3 mm/s to 0.5 mm/s, 0.3 mm/s to 0.8 mm/s, 0.3 mm/s to 1 mm/s, 0.4 mm/s to 0.5 mm/s, 0.4 mm/s to 0.8 mm/s, 0.4 mm/s to 1 mm/s, 0.5 mm/s to 0.8 mm/s, 0.5 mm/s to 1 mm/s, 0.6 mm/s to 0.8 mm/s, 0.6 mm/s to 1 mm/s, 0.7 mm/s to 0.8 mm/s, 0.7 mm/s to 1 mm/s, 0.8 mm/s to 1 mm/s, or 0.9 mm/s to 1 mm/s).

In some embodiments, each of the plurality of first regions includes a first optically isotropic phase (e.g., including a plurality of domains lacking alignment along the initial columnar director). In some embodiments, the exposing step and/or the thermally melting step provides disorder within the plurality of first regions.

In some embodiments, the thermally melting step includes exposing the film to a thermal heat source or an optical source that is translated at a speed of from about 1 mm/s to about 200 mm/s. In other embodiments, the exposing step includes exposing the film to a thermal heat source or an optical source that is translated at a speed of from about 1 mm/s to about 200 mm/s In particular embodiments, the thermal heat source (e.g., an optical source, such as the first optical source) is translated at a speed of from about 1 mm/s to about 200 mm/s (e.g., from 1 mm/s to 10 mm/s, 1 mm/s to 25 mm/s, 1 mm/s to 50 mm/s, 1 mm/s to 75 mm/s, 1 mm/s to 100 mm/s, 1 mm/s to 125 mm/s, 1 mm/s to 150 mm/s, 1 mm/s to 175 mm/s, 2 mm/s to 10 mm/s, 2 mm/s to 25 mm/s, 2 mm/s to 50 mm/s, 2 mm/s to 75 mm/s, 2 mm/s to 100 mm/s, 2 mm/s to 125 mm/s, 2 mm/s to 150 mm/s, 2 mm/s to 175 mm/s, 2 mm/s to 200 mm/s, 5 mm/s to 10 mm/s, 5 mm/s to 25 mm/s, 5 mm/s to 50 mm/s, 5 mm/s to 75 mm/s, 5 mm/s to 100 mm/s, 5 mm/s to 125 mm/s, 5 mm/s to 150 mm/s, 5 mm/s to 175 mm/s, 5 mm/s to 200 mm/s, 10 mm/s to 25 mm/s, 10 mm/s to 50 mm/s, 10 mm/s to 75 mm/s, 10 mm/s to 100 mm/s, 10 mm/s to 125 mm/s, 10 mm/s to 150 mm/s, 10 mm/s to 175 mm/s, 10 mm/s to 200 mm/s, 20 mm/s to 25 mm/s, 20 mm/s to 50 mm/s, 20 mm/s to 75 mm/s, 20 mm/s to 100 mm/s, 20 mm/s to 125 mm/s, 20 mm/s to 150 mm/s, 20 mm/s to 175 mm/s, 20 mm/s to 200 mm/s, 30 mm/s to 50 mm/s, 30 mm/s to 75 mm/s, 30 mm/s to 100 mm/s, 30 mm/s to 125 mm/s, 30 mm/s to 150 mm/s, 30 mm/s to 175 mm/s, 30 mm/s to 200 mm/s, 40 mm/s to 50 mm/s, 40 mm/s to 75 mm/s, 40 mm/s to 100 mm/s, 40 mm/s to 125 mm/s, 40 mm/s to 150 mm/s, 40 mm/s to 175 mm/s, 40 mm/s to 200 mm/s, 50 mm/s to 75 mm/s, 50 mm/s to 100 mm/s, 50 mm/s to 125 mm/s, 50 mm/s to 150 mm/s, 50 mm/s to 175 mm/s, 50 mm/s to 200 mm/s, 60 mm/s to 75 mm/s, 60 mm/s to 100 mm/s, 60 mm/s to 125 mm/s, 60 mm/s to 150 mm/s, 60 mm/s to 175 mm/s, 60 mm/s to 200 mm/s, 70 mm/s to 75 mm/s, 70 mm/s to 100 mm/s, 70 mm/s to 125 mm/s, 70 mm/s to 150 mm/s, 70 mm/s to 175 mm/s, 70 mm/s to 200 mm/s, 80 mm/s to 100 mm/s, 80 mm/s to 125 mm/s, 80 mm/s to 150 mm/s, 80 mm/s to 175 mm/s, 80 mm/s to 200 mm/s, 90 mm/s to 100 mm/s, 90 mm/s to 125 mm/s, 90 mm/s to 150 mm/s, 90 mm/s to 175 mm/s, 90 mm/s to 200 mm/s, 100 mm/s to 125 mm/s, 100 mm/s to 150 mm/s, 100 mm/s to 175 mm/s, 100 mm/s to 200 mm/s, 150 mm/s to 175 mm/s, 150 mm/s to 200 mm/s, or 175 mm/s to 200 mm/s).

In some embodiments, the pattern further includes a plurality of second regions. In further embodiments, each of the plurality of second regions includes a second optically anisotropic phase (e.g., including a plurality of aligned domains arranged in an aligned columnar phase characterized by a second columnar director that is different than the first and/or the initial columnar directors). In some embodiments, the exposing step and/or the thermally melting step provides alignment within the plurality of second regions.

In some embodiments, the film includes an initial optically isotropic phase. In further embodiments, each of the plurality of first regions includes a first optically anisotropic phase (e.g., including a plurality of aligned domains arranged in an aligned columnar phase characterized by a first columnar director). In some embodiments, the exposing step and/or the thermally melting step provides alignment within the plurality of first regions.

In some embodiments, the method further comprises: erasing by exposing first pattern to a second optical source (e.g., in which the first and second optical sources can be same or different); and/or exposing the film to a first optical source to provide a second pattern disposed within the film, in which the second pattern includes a plurality of first regions (e.g., any described herein, and/or second regions and/or third regions, such as any described herein); and/or thermally melting the film (e.g., or the first pattern within the film).

In any embodiment herein, the film can be disposed on a substrate (e.g., a flexible substrate, glass, a polymer, etc.).

In any embodiment herein, the pattern can include a plurality of isotropic regions and/or a plurality of anisotropic regions.

In any embodiment herein, each domain of the plurality of domains includes a donor moiety and an acceptor moiety.

In any embodiment herein, the charge-transfer material can include a donor moiety and an acceptor moiety.

In any embodiment herein, the donor moiety includes a structure of any one of (I), (Ia), (II), (IIa), (III), (IIIa), (IV), (IVa), (V), (Va), (VI), and (VII), or a salt thereof.

In any embodiment herein, the acceptor moiety includes a structure of any one of (VIII), (IX), (X), (XI), (XII), and (XIII), or a salt thereof.

In any embodiment herein, the donor moiety includes a structure of any one of (I), (Ia), (II), and (IIa), or a salt thereof; and wherein the acceptor moiety includes a structure of any one of (VIII) and (XIII), or a salt thereof.

Definitions

As used herein, the term "about" means+/−10% of any recited value. As used herein, this term modifies any recited value, range of values, or endpoints of one or more ranges.

As used herein, the term "about" means+/−10% of any recited value. As used herein, this term modifies any recited value, range of values, or endpoints of one or more ranges.

The term "acyl," or "alkanoyl," as used interchangeably herein, represent an alkyl group, as defined herein, or hydrogen attached to the parent molecular group through a carbonyl group, as defined herein. This group is exemplified by formyl, acetyl, propionyl, butanoyl, and the like.

The alkanoyl group can be substituted or unsubstituted. For example, the alkanoyl group can be substituted with one or more substitution groups, as described herein for alkyl. In some embodiments, the unsubstituted acyl group is a $C_{2-7}$ acyl or alkanoyl group.

By "alkaryl" is meant an aryl group, as defined herein, attached to the parent molecular group through an alkylene group, as defined herein. Similarly, by the term "alkheteroaryl" is meant a heteroaryl group, as defined herein, attached to the parent molecular group through an alkylene group. Other groups preceded by the prefix "alk-" are defined in the same manner. The alkaryl group can be substituted or unsubstituted. For example, the alkaryl group can be substituted with one or more substitution groups, as described herein for alkyl and/or aryl. Exemplary unsubstituted alkaryl groups are of from 7 to 16 carbons ($C_{7-16}$ alkaryl), as well as those having an alkylene group with 1 to 6 carbons and an aryl group with 4 to 18 carbons (i.e., $C_{1-6}$ alk-$C_{4-18}$ aryl).

By "alkenyl" is meant an optionally substituted $C_{2-24}$ alkyl group having one or more double bonds. The alkenyl group can be cyclic (e.g., $C_{3-24}$ cycloalkenyl) or acyclic. The alkenyl group can also be substituted or unsubstituted. For example, the alkenyl group can be substituted with one or more substitution groups, as described herein for alkyl.

By "alkheterocyclyl" represents a heterocyclyl group, as defined herein, attached to the parent molecular group through an alkylene group, as defined herein. Exemplary unsubstituted alkheterocyclyl groups are of from 2 to 14 carbons.

By "alkoxy" is meant —OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

By "alkoxyalkyl" is meant an alkyl group, as defined herein, which is substituted with an alkoxy group, as defined herein. Exemplary unsubstituted alkoxyalkyl groups include between 2 to 12 carbons ($C_{2-12}$ alkoxyalkyl), as well as those having an alkyl group with 1 to 6 carbons and an alkoxy group with 1 to 6 carbons (i.e., $C_{1-6}$ alkoxy-$C_{1-6}$ alkyl).

By "alkoxycarbonyl" is meant an alkoxy group, as defined herein, that is attached to the parent molecular group through a carbonyl group. In some embodiments, an unsubstituted alkoxycarbonyl group is a $C_{2-7}$ alkoxycarbonyl group.

By "alkyl" and the prefix "alk" is meant a branched or unbranched saturated hydrocarbon group of 1 to 32 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be branched or unbranched. The alkyl group can also be substituted or unsubstituted. For example, the alkyl group can be substituted with one, two, three or, in the case of alkyl groups of two carbons or more, four substituents independently selected from the group consisting of: (1) $C_{1-6}$ alkoxy (e.g., —OAk, in which Ak is an alkyl group, as defined herein); (2) $C_{1-6}$ alkylsulfinyl (e.g., —S(O)Ak, in which Ak is an alkyl group, as defined herein); (3) $C_{1-6}$ alkylsulfonyl (e.g., —SO$_2$Ak, in which Ak is an alkyl group, as defined herein); (4) amino (e.g., —NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group); (5) aryl; (6) arylalkoxy (e.g., —OA$^L$Ar, in which A$^L$ is an alkylene group and Ar is an aryl group, as defined herein); (7) aryloyl (e.g., —C(O)Ar, in which Ar is an aryl group, as defined herein); (8) azido (e.g., an —N$_3$ group); (9) cyano (e.g., a —CN group); (10) carboxyaldehyde (e.g., a —C(O)H group); (11) $C_{3-8}$ cycloalkyl; (12) halo; (13) heterocyclyl (e.g., a 5-, 6- or 7-membered ring, unless otherwise specified, containing one, two, three, or four non-carbon heteroatoms (e.g., independently selected from the group consisting of nitrogen, oxygen, phosphorous, sulfur, or halo)); (14) heterocyclyloxy (e.g., —OHet, in which Het is a heterocyclyl group); (15) heterocyclyloyl (e.g., —C(O)Het, in which Het is a heterocyclyl group); (16) hydroxyl (e.g., a —OH group); (17) N-protected amino; (18) nitro (e.g., an —NO$_2$ group); (19) oxo (e.g., a =O group); (20) $C_{3-8}$ spirocyclyl (e.g., an alkylene diradical, both ends of which are bonded to the same carbon atom of the parent group to form a spirocyclyl group); (21) $C_{1-6}$ thioalkoxy (e.g., —SAk, in which Ak is an alkyl group, as defined herein); (22) thiol (e.g., an —SH group); (23) —CO$_2$R$^A$ (e.g., —(CO)OR$^A$ or —O(CO)R$^A$), where R$^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (24) —C(O)NR$^B$R$^C$, where each of R$^B$ and R$^C$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (25) —SO$_2$R$^D$, where R$^D$ is selected from the group consisting of (a) $C_{1-6}$ alkyl, (b) $C_{4-18}$ aryl, and (c) $C_{1-6}$ alk-$C_{4-18}$ aryl; (26) —SO$_2$NR$^E$R$^F$, where each of R$^E$ and R$^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; and (27) —NR$^G$R$^h$, where each of R$^G$ and R$^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{1-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group. The alkyl group can be a primary, secondary, or tertiary alkyl group substituted with one or more substituents (e.g., one or more halo or alkoxy). In some embodiments, the unsubstituted alkyl group is a $C_{1-3}$, $C_{1-6}$, $C_{1-12}$, $C_{1-16}$, $C_{1-18}$, $C_{1-20}$, $C_{1-24}$, $C_{1-28}$, $C_{1-30}$, or $C_{1-32}$ alkyl group.

By "alkylcarbonyloxy" is meant an —O—C(O)—R group, in which R is an alkyl group, as defined herein.

By "alkylene" is meant a multivalent (e.g., bivalent, trivalent, tetravalent, etc.) form of an alkyl group, as described herein. Exemplary alkylene groups include methylene, ethylene, propylene, butylene, etc. In some embodiments, the alkylene group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkylene group. The alkylene group can be branched or unbranched. The alkylene group can also be substituted or unsubstituted. For example, the alkylene group can be substituted with one or more substitution groups, as described herein for alkyl.

By "alkyleneoxy" is meant an alkylene group, as defined herein, attached to the parent molecular group through an oxygen atom.

By "alkynyl" is meant an optionally substituted $C_{2-24}$ alkyl group having one or more triple bonds. The alkynyl group can be cyclic or acyclic and is exemplified by ethynyl, 1-propynyl, and the like. The alkynyl group can also be substituted or unsubstituted. For example, the alkynyl group can be substituted with one or more substitution groups, as described herein for alkyl.

By "amino" is meant —NR$^{N1}$R$^{N2}$, where each of R$^{N1}$ and R$^{N2}$ is, independently, H or optionally substituted alkyl, aryl, or alkaryl, or R$^{N1}$ and R$^{N2}$, taken together with the nitrogen atom to which each are attached, form a heterocyclyl group, as defined herein.

By "aryl" is meant a group that contains any carbon-based aromatic group including, but not limited to, benzyl, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one, two, three, four, or five substituents independently selected from the group consisting of: (1) $C_{1-6}$ alkanoyl (e.g., —C(O)Ak, in which Ak is an alkyl group, as defined herein); (2) $C_{1-6}$ alkyl; (3) $C_{1-6}$ alkoxy (e.g., —OAk, in which Ak is an alkyl group, as defined herein); (4) $C_{1-6}$ alkoxy-$C_{1-6}$ alkyl (e.g., an alkyl group, which is substituted with an alkoxy group —OAk, in which Ak is an alkyl group, as defined herein); (5) $C_{1-6}$ alkylsulfinyl (e.g., —S(O)Ak, in which Ak is an alkyl group, as defined herein); (6) $C_{1-6}$ alkylsulfinyl-$C_{1-6}$ alkyl (e.g., an alkyl group, which is substituted by an alkylsulfinyl group —S(O)Ak, in which Ak is an alkyl group, as defined herein); (7) $C_{1-6}$ alkylsulfonyl (e.g., —SO$_2$Ak, in which Ak is an alkyl group, as defined herein); (8) $C_{1-6}$ alkylsulfonyl-$C_{1-6}$ alkyl (e.g., an alkyl group, which is substituted by an alkylsulfonyl group —SO$_2$Ak, in which Ak is an alkyl group, as defined herein); (9) aryl; (10) amino (e.g., —NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group); (11) $C_{1-6}$ aminoalkyl (e.g., meant an alkyl group, as defined herein, substituted by an amino group); (12) heteroaryl; (13) $C_{1-6}$ alk-$C_{4-ix}$ aryl (e.g., -A$^L$Ar, in which A$^L$ is an alkylene group and Ar is an aryl group, as defined herein); (14) aryloyl (e.g., —C(O)Ar, in which Ar is an aryl group, as defined herein); (15) azido (e.g., an —N$_3$ group); (16) cyano (e.g., a —CN group); (17) $C_{1-6}$ azidoalkyl (e.g., a —N$_3$ azido group attached to the parent molecular group through an alkyl group, as defined herein); (18) carboxyaldehyde (e.g., a —C(O)H group); (19) carboxyaldehyde-$C_{1-6}$ alkyl (e.g., -A$^L$C(O)H, in which A$^L$ is an alkylene group, as defined herein); (20) $C_{3-8}$ cycloalkyl; (21) $C_{1-6}$ alk-$C_{3-8}$ cycloalkyl (e.g., -A$^L$Cy, in which A$^L$ is an alkylene group and Cy is a cycloalkyl group, as defined herein); (22) halo (e.g., F, Cl, Br, or I); (23) $C_{1-6}$ haloalkyl (e.g., an alkyl group, as defined herein, substituted with one or more halo); (24) heterocyclyl; (25) heterocyclyloxy (e.g., —OHet, in which Het is a heterocyclyl group); (26) heterocyclyloyl (e.g., —C(O)Het, in which Het is a heterocyclyl group); (16) hydroxyl (e.g., a —OH group); (27) hydroxyl (e.g., a —OH group); (28) $C_{1-6}$ hydroxyalkyl (e.g., an alkyl group, as defined herein, substituted by one to three hydroxyl groups, with the proviso that no more than one hydroxyl group may be attached to a single carbon atom of the alkyl group); (29) nitro (e.g., an —NO$_2$ group); (30) $C_{1-6}$ nitroalkyl (e.g., an alkyl group, as defined herein, substituted by one to three nitro groups); (31) N-protected amino; (32) N-protected amino-$C_{1-6}$ alkyl; (33) oxo (e.g., an =O group); (34) $C_{1-6}$ thioalkoxy (e.g., —SAk, in which Ak is an alkyl group, as defined herein); (35) thio-$C_{1-6}$ alkoxy-$C_{1-6}$ alkyl (e.g., an alkyl group, which is substituted by an thioalkoxy group —SAk, in which Ak is an alkyl group, as defined herein); (36) —(CH$_2$)$_r$CO$_2$R$^A$, where r is an integer of from zero to four, and R$^A$ is selected from the group consisting of (a) hydrogen, (b) $C_{1-6}$ alkyl, (c) $C_{4-18}$ aryl, and (d) $C_{1-6}$ alk-$C_{1-18}$ aryl; (37) —(CH$_2$)$_r$CONR$^B$R$^C$, where r is an integer of from zero to four and where each R$^B$ and R$^C$ is independently selected from the group consisting of (a) hydrogen, (b) $C_{1-6}$ alkyl, (c) $C_{4-18}$ aryl, and (d) $C_{1-6}$ alk-$C_{4-18}$ aryl; (38) —(CH$_2$)$_r$SO$_2$R$^D$, where r is an integer of from zero to four and where R$^D$ is selected from the group consisting of (a) $C_{1-6}$ alkyl, (b) $C_{4-18}$ aryl, and (c) $C_{1-6}$ alk-$C_{4-18}$ aryl; (39) —(CH$_2$)$_r$SO$_2$NR$^E$R$^F$, where r is an integer of from zero to four and where each of R$^E$ and R$^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (40) —(CH$_2$)$_r$NR$^G$R$^H$, where r is an integer of from zero to four and where each of R$^G$ and R$^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-ix}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group; (41) thiol; (42) perfluoroalkyl (e.g., an alkyl group, as defined herein, having each hydrogen atom substituted with a fluorine atom); (43) perfluoroalkoxy (e.g., —ORf, in which Rf is an alkyl group, as defined herein, having each hydrogen atom substituted with a fluorine atom); (44) aryloxy (e.g., —OAr, where Ar is an optionally substituted aryl group, as described herein); (45) cycloalkoxy (e.g., —OCy, in which Cy is a cycloalkyl group, as defined herein); (46) cycloalkylalkoxy (e.g., —OA$^L$Cy, in which A$^L$ is an alkylene group and Cy is a cycloalkyl group, as defined herein); and (47) arylalkoxy (e.g., —OA$^L$Ar, in which A$^L$ is an alkylene group and Ar is an aryl group, as defined herein). In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

By "arylene" is meant a multivalent (e.g., bivalent, trivalent, tetravalent, etc.) form of an aryl group, as described herein. Exemplary arylene groups include phenylene, naphthylene, biphenylene, triphenylene, diphenyl ether, acenaphthenylene, anthrylene, or phenanthrylene. In some embodiments, the arylene group is a $C_{4-18}$, $C_{4-14}$, $C_{4-12}$, $C_{4-10}$, $C_{6-18}$, $C_{6-14}$, $C_{6-12}$, or $C_{6-10}$ arylene group. The arylene group can be branched or unbranched. The arylene group can also be substituted or unsubstituted. For example, the arylene group can be substituted with one or more substitution groups, as described herein for aryl.

By "aryleneoxy" is meant an arylene group, as defined herein, attached to the parent molecular group through an oxygen atom.

By "arylalkoxy" is meant an alkaryl group, as defined herein, attached to the parent molecular group through an oxygen atom.

By "aryloxy" is meant —OR, where R is an optionally substituted aryl group, as described herein. In some embodiments, an unsubstituted aryloxy group is a $C_{4-18}$ or $C_{6-18}$ aryloxy group.

By "aryloxycarbonyl" is meant an aryloxy group, as defined herein, that is attached to the parent molecular group through a carbonyl group. In some embodiments, an unsubstituted aryloxycarbonyl group is a $C_{5-19}$ aryloxycarbonyl group.

By "aryloyl" is meant an aryl group that is attached to the parent molecular group through a carbonyl group. In some embodiments, an unsubstituted aryloyl group is a $C_{7-11}$ aryloyl group.

By "carbonyl" is meant a —C(O)— group, which can also be represented as >C=O.

By "carboxyaldehyde" is meant a —C(O)H group.

By "carboxyaldehydealkyl" is meant a carboxyaldehyde group, as defined herein, attached to the parent molecular group through an alkylene group, as defined herein.

By "carboxyl" is meant a —CO₂H group.

By "cyano" is meant a —CN group.

By "cycloalkyl" is meant a monovalent saturated or unsaturated non-aromatic cyclic hydrocarbon group of from three to eight carbons, unless otherwise specified, and is exemplified by cyclopropyl, cyclobutyl, cyclopentyl, cyclohexyl, cycloheptyl, bicyclo[2.2.1.]heptyl and the like. The cycloalkyl group can also be substituted or unsubstituted. For example, the cycloalkyl group can be substituted with one or more groups including those described herein for alkyl.

By "cycloalkoxy" is meant a cycloalkyl group, as defined herein, attached to the parent molecular group through an oxygen atom.

By "halo" is meant F, Cl, Br, or I.

By "haloalkyl" is meant an alkyl group, as defined herein, substituted with one or more halo.

By "heteroalkyl" is meant an alkyl group, as defined herein, containing one, two, three, or four non-carbon heteroatoms (e.g., independently selected from the group consisting of nitrogen, oxygen, phosphorous, sulfur, or halo). Exemplary heteroalkyl groups include, e.g., a poly(ethylene glycol) (PEG) group —(OCH$_2$CH$_2$)$_n$OR, wherein n is any useful number in any of these (e.g., of from about 1 to 20) and R is H or alkyl, as defined herein.

By "heteroalkylene" is meant a divalent form of an alkylene group, as defined herein, containing one, two, three, or four non-carbon heteroatoms (e.g., independently selected from the group consisting of nitrogen, oxygen, phosphorous, sulfur, or halo).

By "heteroalkyleneoxy" is meant a heteroalkylene group, as defined herein, attached to the parent molecular group through an oxygen atom.

By "heteroaryl" is meant a subset of heterocyclyl groups, as defined herein, which are aromatic, i.e., they contain 4n+2 pi electrons within the mono- or multicyclic ring system.

By "heterocyclyl" is meant a 5-, 6- or 7-membered ring, unless otherwise specified, containing one, two, three, or four non-carbon heteroatoms (e.g., independently selected from the group consisting of nitrogen, oxygen, phosphorous, sulfur, or halo). The 5-membered ring has zero to two double bonds and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include thiiranyl, thietanyl, tetrahydrothienyl, thianyl, thiepanyl, aziridinyl, azetidinyl, pyrrolidinyl, piperidinyl, azepanyl, pyrrolyl, pyrrolinyl, pyrazolyl, pyrazolinyl, pyrazolidinyl, imidazolyl, imidazolinyl, imidazolidinyl, pyridyl, homopiperidinyl, pyrazinyl, piperazinyl, pyrimidinyl, pyridazinyl, oxazolyl, oxazolidinyl, isoxazolyl, isoxazolidiniyl, morpholinyl, thiomorpholinyl, thiazolyl, thiazo-lidinyl, isothiazolyl, isothiazolidinyl, indolyl, quinolinyl, isoquinolinyl, benzimidazolyl, benzothiazolyl, benzoxazolyl, furyl, thienyl, thiazolidinyl, isothiazolyl, isoindazoyl, triazolyl, tetrazolyl, oxadiazolyl, uricyl, thiadiazolyl, pyrimidyl, tetrahydrofuranyl, dihydrofuranyl, tetrahydrothienyl, dihydrothienyl, dihydroindolyl, tetrahydroquinolyl, tetrahydroisoquinolyl, pyranyl, dihydropyranyl, dithiazolyl, benzofuranyl, benzothienyl, and the like.

By "heterocyclyloxy" is meant a heterocyclyl group, as defined herein, attached to the parent molecular group through an oxygen atom.

By "heterocyclyloyl" is meant a heterocyclyl group, as defined herein, attached to the parent molecular group through a carbonyl group.

By "hydroxyl" is meant —OH.

By "nitro" is meant an —NO$_2$ group.

By "nitroalkyl" is meant an alkyl group, as defined herein, substituted by one to three nitro groups.

By "nitroso" is meant an —NO group.

By "oxo" is meant an =O group.

By "oxy" is meant —O—.

By "perfluoroalkyl" is meant an alkyl group, as defined herein, having each hydrogen atom substituted with a fluorine atom. Exemplary perfluoroalkyl groups include trifluoromethyl, pentafluoroethyl, etc.

By "perfluoroalkylene" is meant an alkylene group, as defined herein, having each hydrogen atom substituted with a fluorine atom. Exemplary perfluoroalkylene groups include difluoromethylene, tetrafluoroethylene, etc.

By "perfluoroalkyleneoxy" is meant a perfluoroalkylene group, as defined herein, having an oxy group attached to either end of the perfluoroalkylene group. Exemplary perfluoroalkylene groups include, e.g., —OC$_f$F$_{2f}$— or —C$_f$F$_{2f}$O—, where f is an integer from about 1 to 5, and 2f is an integer that is 2 times f (e.g., difluoromethyleneoxy, tetrafluoroethyleneoxy, etc.).

By "perfluoroalkoxy" is meant an alkoxy group, as defined herein, having each hydrogen atom substituted with a fluorine atom.

By "protecting group" is meant any group intended to protect a reactive group against undesirable synthetic reactions. Commonly used protecting groups are disclosed in "Greene's Protective Groups in Organic Synthesis," John Wiley & Sons, New York, 2007 (4th ed., eds. P. G. M. Wuts and T. W. Greene), which is incorporated herein by reference. O-protecting groups include an optionally substituted alkyl group (e.g., forming an ether with reactive group O), such as methyl, methoxymethyl, methylthiomethyl, benzoyloxymethyl, t-butoxymethyl, etc.; an optionally substituted alkanoyl group (e.g., forming an ester with the reactive group O), such as formyl, acetyl, chloroacetyl, fluoroacetyl (e.g., perfluoroacetyl), methoxyacetyl, pivaloyl, t-butylacetyl, phenoxyacetyl, etc.; an optionally substituted aryloyl group (e.g., forming an ester with the reactive group O), such as —C(O)—Ar, including benzoyl; an optionally substituted alkylsulfonyl group (e.g., forming an alkyl sulfonate with reactive group O), such as —SO$_2$—R$^{S1}$, where R$^{S1}$ is optionally substituted $C_{1-12}$ alkyl, such as mesyl or benzylsulfonyl; an optionally substituted arylsulfonyl group (e.g., forming an arylsulfonate with reactive group O), such as —SO$_2$—R$^{S4}$, where R$^{S4}$ is optionally substituted $C_{4-ix}$ aryl, such as tosyl or phenylsulfonyl; an optionally substituted alkoxycarbonyl or aryloxycarbonyl group (e.g., forming a carbonate with reactive group O), such as —C(O)—OR$^{T1}$, where R$^{T1}$ is optionally substituted $C_{1-12}$ alkyl or optionally substituted $C_{4-18}$ aryl, such as methoxycarbonyl, methoxymethylcarbonyl, t-butyloxycarbonyl (Boc), or benzyloxycarbonyl (Cbz); or an optionally substituted silyl group (e.g., forming a silyl ether with reactive group O), such as —Si—$(R^{72})_3$, where each $R^{72}$ is, independently, optionally substituted $C_{1-12}$ alkyl or optionally substituted $C_{4-ix}$ aryl, such as trimethylsilyl, t-butyldimethylsilyl, or t-butyldiphenylsilyl. N-protecting groups include, e.g., formyl, acetyl, benzoyl, pivaloyl, t-butylacetyl, alanyl, phenylsulfonyl, benzyl, Boc, and Cbz. Such protecting groups can employ any useful agent to cleave the protecting group, thereby restoring the reactivity of the unprotected reactive group.

By "salt" is meant an ionic form of a compound or structure (e.g., any formulas, compounds, or compositions described herein), which includes a cation or anion compound to form an electrically neutral compound or structure. Salts (e.g., simple salts having binary compounds, double salts, triple salts, etc.) are well known in the art. For example, salts are described in Berge S M et al., "Pharmaceutical salts," J. Pharm. Sci. 1977 January; 66(1):1-19; International Union of Pure and Applied Chemistry, "Nomenclature of Inorganic Chemistry," Butterworth & Co. (Publishers) Ltd., London, England, 1971 (2nd ed.); and in "Handbook of Pharmaceutical Salts: Properties, Selection, and Use," Wiley-VCH, April 2011 (2nd rev. ed., eds. P. H. Stahl and C. G. Wermuth). The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, glucomate, glutamate, glycerophosphate, hemisulfate, heptonate, hexanoate, hydrobromide, hydrochloride, hydroiodide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methyl sulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine.

By "solvate" is meant a stabilized form of a compound or structure (e.g., any formulas, compounds, or compositions described herein, including anionic or cationic forms thereof) with one or more solvent molecules. Such forms can be stabilized by any useful interaction, such as electrostatic forces, van der Waals forces, or hydrogen bond formation. Exemplary solvates include hydrates (including one or more water molecules).

By "anhydrate" is meant a form of a compound or structure (e.g., any formulas, compounds, or compositions described herein) generally lacking solvent molecules.

By "thio" is meant an —S— group.

By "thioalkaryl" is meant a thioalkoxy group, as defined herein, substituted with an aryl group, as defined herein.

By "thioalkheterocyclyl" is meant a thioalkoxy group, as defined herein, substituted with a heterocyclyl group, as defined herein.

By "thioalkoxy" is meant an alkyl group, as defined herein, attached to the parent molecular group through a sulfur atom. Exemplary unsubstituted thioalkoxy groups include $C_{1-6}$ thioalkoxy.

By "thioaryloxy" is meant an aryl group, as defined herein, attached to the parent molecular group through a sulfur atom. Exemplary unsubstituted thioaryloxy groups include $C_{4-18}$ thioaryloxy.

By "thiol" is meant an —SH group.

By "attaching," "attachment," or related word forms is meant any covalent or non-covalent bonding interaction between two components. Non-covalent bonding interactions include, without limitation, hydrogen bonding, ionic interactions, halogen bonding, electrostatic interactions, n bond interactions, hydrophobic interactions, inclusion complexes, clathration, van der Waals interactions, and combinations thereof.

By "micro" is meant having at least one dimension that is less than 1 mm and, optionally, equal to or larger than about 1 μm. For instance, a microstructure (e.g., any structure described herein) can have a length, width, height, cross-sectional dimension, circumference, radius (e.g., external or internal radius), or diameter that is less than 1 mm.

By "nano" is meant having at least one dimension that is less than 1 μm but equal to or larger than about 1 nm. For instance, a nanostructure (e.g., any structure described herein, such as a nanoparticle) can have a length, width, height, cross-sectional dimension, circumference, radius (e.g., external or internal radius), or diameter that is less than 1 μm but equal to or larger than 1 nm. In other instances, the nanostructure has a dimension that is of from about 1 nm to about 1 μm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

The present invention relates to optical codes, as well as methods for making, using, and reading such codes. In one embodiment, the optical code includes a film composed of a charge-transfer (CT) material (e.g., any described herein). In particular, the CT material is capable of being aligned in an optical manner, such as exposure of the material to an optical source results in an ordered phase (e.g., an anisotropic phase) or a disordered phase (e.g., an isotropic phase). For instance, if the initial film possesses an ordered phase (e.g., an initial aligned columnar phase characterized by an initial columnar director), then exposure to an optical source can produce a disordered phase (e.g., an isotropic phase lacking any columnar director) or an ordered phase (e.g., an anisotropic phase characterized by a first columnar director that is different than the initial columnar director). In another instance, if the initial film possesses a disordered phase (e.g., an isotropic phase lacking any columnar director), then exposure to an optical source can produce an ordered phase (e.g., an anisotropic phase characterized by a first columnar director).

The CT material should be composed of components (or compounds or moieties) that is capable of forming an aligned columnar phase. In this way, exposure to an optical source (e.g., a laser) can then provide a disordered phase, an aligned phase, or a re-aligned phase (e.g., as described herein). For instance, when ordered, the CT material can be characterized by a columnar director (n), which is parallel to the stacking direction of an assembly having donor and acceptor moieties. If the donor and acceptor moieties are aligned by way of directed stacking that maximizes donor$_{HOMO}$ to acceptor$_{HOMO}$ interactions, then the stacking direction will be orthogonal to the plane of the aromatic groups providing such stacking interactions. In this scenario, director n will orthogonal to the plane of aromatic groups.

Figure 1A:
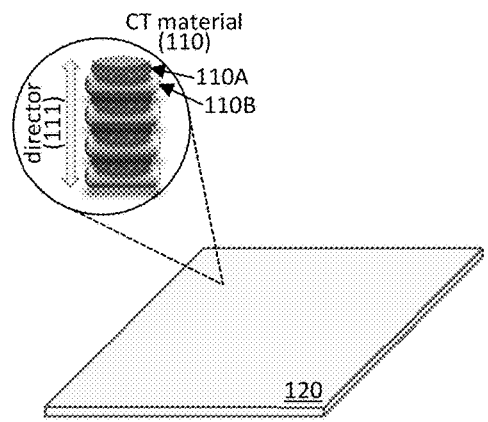
FIG. 1A-1B shows schematics of exemplary films and patterned codes disposed within a film. Provided are (A) an exemplary film 120 including a charge-transfer (CT) material 110 and (B) an exemplary method for providing a patterned code 140 disposed within a film.

FIG. 1A provides an exemplary film 120 formed from an CT material 110 having a plurality of domains. Each domain includes a donor 110A and an acceptor 110B pair, and a plurality of pairs can be aligned to form an aligned columnar phase. The direction of alignment can be characterized by a columnar director 111, which is parallel to the stacking direction of the domains.

Upon providing a film composed of a CT material, an optical code can be written by exposing the film to an optical source to provide a pattern disposed within the film. The composition of the pattern can depend on the initial phase of the film. As described herein, exposure to an optical source (depending on experimental conditions, such as write speed or translation speed of the optical source, the temperature of the optical source, the thermal gradient imposed within the film, the direction of translation, etc.) can provide either an ordered phase or a disordered phase. Overall, the optical source induces a temperature gradient within the film. The magnitude and spatial distribution of this gradient, in combination with the inherent cooling rate of the exposed region, controls the extent of columnar ordering. For instance, an ordered phase can be written by providing a sufficient thermal gradient or a sufficient cooling time (e.g., by employing moderate writing speeds, such as of from about 0.1 to about 0.5 mm s$^{-1}$), thereby providing long-range columnar order. For instance, a disordered phase can be written by providing a sharp thermal gradient or rapid cooling (e.g., by employing fast writing speeds, such more than about 0.5 mm s$^{-1}$), thereby providing disrupted regions.

Figure 1B:
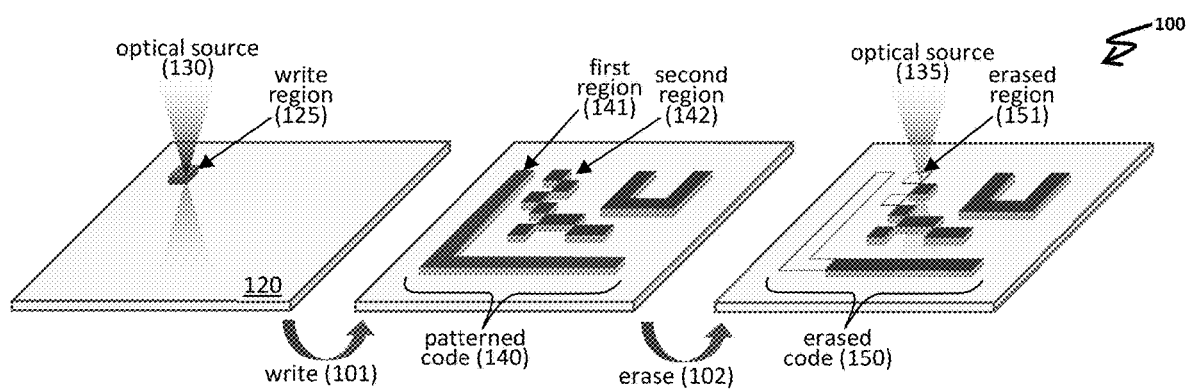

FIG. 1B provides an exemplary method for writing an optical code. The method can include providing a film 120 including a charge-transfer material (e.g., any herein); and exposing the film to a first optical source 130 to provide a pattern (e.g., a patterned code 140) disposed within the film, in which the pattern comprises a plurality of regions (e.g., first regions, such as write regions 125). The exposing step can result in writing 101 of the pattern into the film, thereby providing an optical code.

As can be seen, the exemplary patterned code 140 includes a pattern having a plurality of first regions 141 and a plurality of second regions 142. In one embodiment, the first and second regions are different, in which the difference can be the extent of anisotropy-isotropy or the direction of the director (if both regions exhibit some amount of alignment or anisotropy). As described herein, the optical source can write either an ordered region (e.g., an anisotropic phase) or a disordered region (e.g., an isotropic phase). Thus, an initial ordered film can be written with disordered regions, just as easily as an initial disordered film can be written with ordered regions. Accordingly, in one embodiment, if the first region is a write region including an ordered region (e.g., an anisotropic phase), then the second region can include a disordered region (e.g., an isotropic phase, in which the film can then possess an initial disordered phase). In another embodiment, if the first region is a write region including a disordered region (e.g., an isotropic phase), then the second region can include an ordered region (e.g., an anisotropic phase, in which the film can then possess an initial aligned columnar phase).

The method can further include optionally erasing 102 the patterned code 140 by exposing the pattern to a second optical source 135. For instance, erasing can be accomplished by treating the patterned code with an optical source to provide a uniform phase, either a uniform ordered region (e.g., an anisotropic phase) or a uniform disordered region (e.g., an isotropic phase). Thus, rather than using a spatial pattern to determine which areas of the film to treat in a certain manner, the entire film is treated with a uniform condition to provide a uniformly aligned (or misaligned) region. The erased region 151 including the erased code 150 can then be used as a film upon which another pattern can be written. In this manner, an optical code can be rewritten on the same film.

Figure 2A:
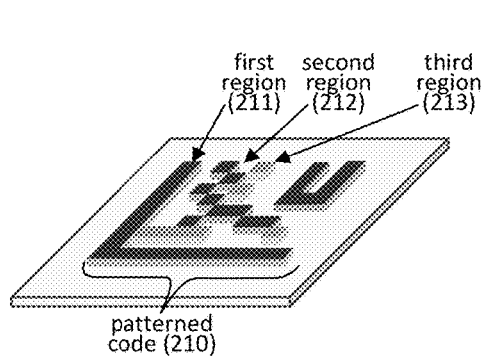
FIG. 2A-2B shows schematics of (A) an exemplary patterned code 210 having various regions and (B) an exemplary diagram of the code showing various regions.
Figure 2B:
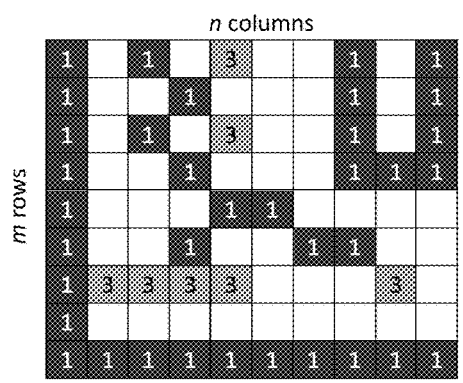

The pattern can include a plurality of regions, in which each region is encoded as one of a first region or a second region (e.g., in which each can be one of a disordered phase or an ordered phase). Alternatively, each region is encoded as one of a first region, a second region, or a third region, in which each can be one of a disordered phase, a first ordered phase, or a second ordered phase. The first and second ordered phase can be characterized by a different columnar director. In this way, the regions will polarize light differently because the columnar directors are different. In this way, rather than binary codes, gray scale codes can be implemented with the optical codes described herein. FIG. 2A shows an exemplary patterned code 210 having a pattern with at least three different regions: a first region 211, a second region 212, and a third region 213. In one non-limiting embodiment, the first region is an ordered phase having a first columnar director; the second region is a disordered phase; and the third region is an ordered phase having a second columnar director that is different than the first columnar director (e.g., in which the first and second columnar directors are orthogonal or not parallel). FIG. 2B shows an exemplary pattern shown as a matrix having m rows and n columns, in which each cell within the matrix can be construed at as a bit having a value of 1 (first region), null (second region), or 3 (third region). Additional details follow.

Charge-Transfer Materials

Figure 20A:
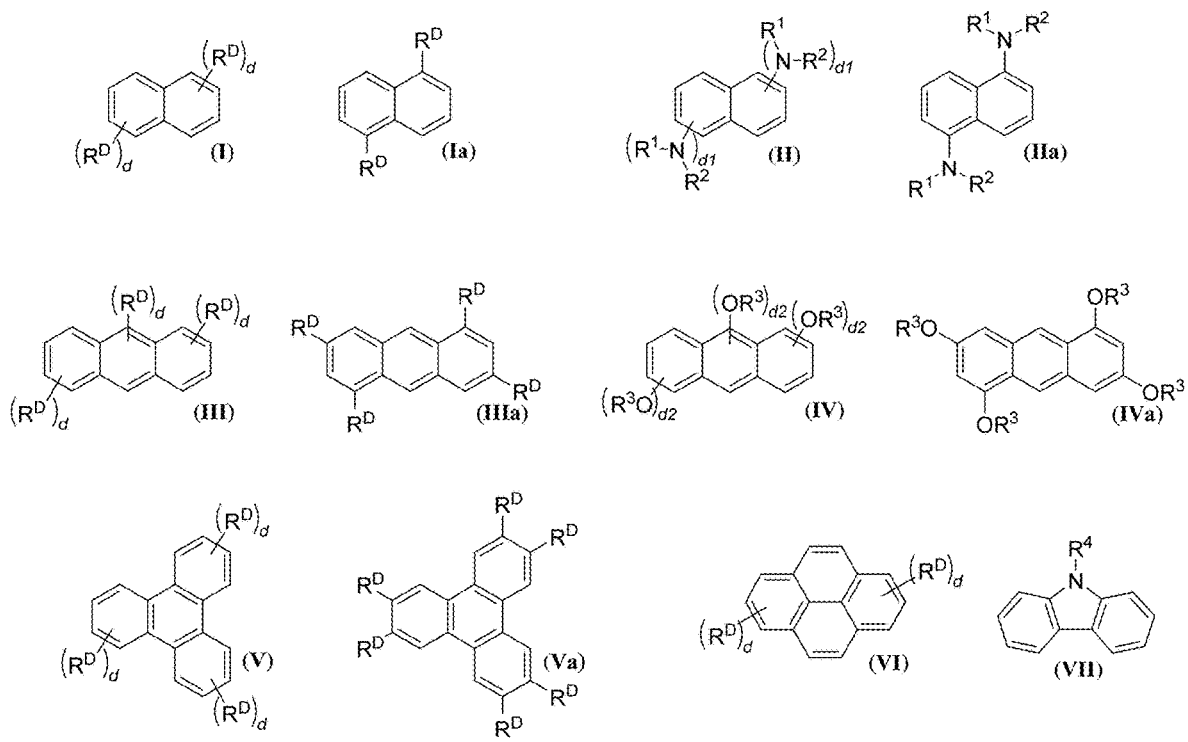
FIG. 20A-20B provides exemplary chemical structures of (A) donor moieties (structures (I), (Ia), (II), (IIa), (III), (IIIa), (IV), (IVa), (V), (Va), (VI), and (VII)); and (B) acceptor moieties (structures (VIII), (IX), (X), (XI), (XII), and (XIII)).

Any useful CT material can be employed. In one instance, the CT material includes a plurality of domains, and each domain includes a donor moiety (e.g., an electron-rich aromatic) and an acceptor moiety (e.g., an electron-poor aromatic). FIG. 20A provides exemplary structures for a donor moiety, including a structure of any one of (I), (Ia), (II), (IIa), (III), (IIIa), (IV), (IVa), (V), (Va), (VI), and (VII), or a salt thereof. For any of these structures, $R^D$ can be H or an electron-rich substituent (e.g., in which at least one $R^D$ is an electron-rich substituent). Exemplary $R^D$ (e.g., for (I), (Ia), (III), (IIIa), (V), (Va), and (VI), or a salt thereof) can include H, optionally substituted alkyl, heteroalkyl, cycloalkyl, alkoxy, alkylcarbonyloxy, amino, aryl, alkaryl, alkanoyl, thioalkoxy, thioaryloxy, thioalkaryl, thioalkheterocyclyl, or hydroxyl; and/or each of d is, independently, an integer from 0 to 4 (e.g., 0 to 1, 0 to 2, 0 to 3, 0 to 4, 1 to 4, 1 to 3, 1 to 2, 2 to 3, 2 to 4, and 3 to 4). For any of these structures (e.g., (II), (IIa), (IV), (IVa), and (VII) or a salt thereof), each of $R^1$ and/or $R^2$ and/or $R^3$ and/or $R^4$ is, independently, H, optionally substituted alkyl, heteroalkyl, cycloalkyl, aryl, alkaryl, or alkanoyl; and/or each of d1 and d2 is, independently, an integer from 0 to 4 (e.g., 0 to 1, 0 to 2, 0 to 3, 0 to 4, 1 to 4, 1 to 3, 1 to 2, 2 to 3, 2 to 4, and 3 to 4).

In one non-limiting embodiment, the donor moiety includes a structure of (I) or a salt thereof; wherein each of $R^D$ is, independently, H, optionally substituted alkyl, heteroalkyl, cycloalkyl, alkoxy, alkylcarbonyloxy, amino, aryl, alkaryl, alkanoyl, thioalkoxy, thioaryloxy, thioalkaryl, thioalkheterocyclyl, or hydroxyl (e.g., in which at least one $R^D$ is not H); and each d is, independently, an integer from 1 to 4 (e.g., 1 to 3, 1 to 2, 2 to 3, 2 to 4, and 3 to 4). In another embodiment, the donor moiety includes a structure of (Ia) or a salt thereof; wherein each of $R^D$ is, independently, H, optionally substituted alkyl, heteroalkyl, cycloalkyl, alkoxy, alkylcarbonyloxy, amino, aryl, alkaryl, alkanoyl, thioalkoxy, thioaryloxy, thioalkaryl, thioalkheterocyclyl, or hydroxyl (e.g., in which at least one $R^D$ is not H).

In one non-limiting embodiment, the donor moiety includes a structure of (II) or a salt thereof; wherein each of $R^1$ and $R^2$ is, independently, H, optionally substituted alkyl, heteroalkyl, cycloalkyl, aryl, alkaryl, or alkanoyl; and each d1 is, independently, an integer from 1 to 4 (e.g., 1 to 3, 1 to 2, 2 to 3, 2 to 4, and 3 to 4). In another embodiment, the donor moiety includes a structure of (IIa) or a salt thereof; wherein each of $R^1$ and $R^2$ is, independently, H, optionally substituted alkyl, heteroalkyl, cycloalkyl, aryl, alkaryl, or alkanoyl.

In one non-limiting embodiment, the donor moiety includes a structure of (III) or a salt thereof; wherein each of $R^D$ is, independently, H, optionally substituted alkyl, heteroalkyl, cycloalkyl, alkoxy, alkylcarbonyloxy, amino, aryl, alkaryl, alkanoyl, thioalkoxy, thioaryloxy, thioalkaryl, thioalkheterocyclyl, or hydroxyl (e.g., in which at least one $R^D$ is not H); and each d is, independently, an integer from 1 to 4 (e.g., 1 to 3, 1 to 2, 2 to 3, 2 to 4, and 3 to 4, such as each d of the left and right phenyl rings in (III) is, independently, an integer from 1 to 4, and d of the center phenyl ring in (III) is 1 or 2). In another embodiment, the donor moiety includes a structure of (IIIa) or a salt thereof; wherein each of $R^D$ is, independently, H, optionally substituted alkyl, heteroalkyl, cycloalkyl, alkoxy, alkylcarbonyloxy, amino, aryl, alkaryl, alkanoyl, thioalkoxy, thioaryloxy, thioalkaryl, thioalkheterocyclyl, or hydroxyl (e.g., in which at least one $R^D$ is not H).

In one non-limiting embodiment, the donor moiety includes a structure of (IV) or a salt thereof; wherein each $R^3$ is, independently, H, optionally substituted alkyl, heteroalkyl, cycloalkyl, aryl, alkaryl, or alkanoyl; and each d2 is, independently, an integer from 1 to 4 (e.g., 1 to 3, 1 to 2, 2 to 3, 2 to 4, and 3 to 4, such as each d2 of the left and right phenyl rings in (IV) is, independently, an integer from 1 to 4, and d2 of the center phenyl ring in (IV) is 1 or 2). In another embodiment, the donor moiety includes a structure of (IVa) or a salt thereof; wherein each $R^3$ is, independently, H, optionally substituted alkyl, heteroalkyl, cycloalkyl, aryl, alkaryl, or alkanoyl.

In one non-limiting embodiment, the donor moiety includes a structure of (V) or a salt thereof; wherein each of $R^D$ is, independently, H, optionally substituted alkyl, heteroalkyl, cycloalkyl, alkoxy, alkylcarbonyloxy, amino, aryl, alkaryl, alkanoyl, thioalkoxy, thioaryloxy, thioalkaryl, thioalkheterocyclyl, or hydroxyl (e.g., in which at least one $R^D$ is not H); and each d is, independently, an integer from 1 to 4 (e.g., 1 to 3, 1 to 2, 2 to 3, 2 to 4, and 3 to 4). In another embodiment, the donor moiety includes a structure of (Va) or a salt thereof; wherein each of $R^D$ is, independently, H, optionally substituted alkyl, heteroalkyl, cycloalkyl, alkoxy, alkylcarbonyloxy, amino, aryl, alkaryl, alkanoyl, thioalkoxy, thioaryloxy, thioalkaryl, thioalkheterocyclyl, or hydroxyl (e.g., in which at least one $R^D$ is not H).

In one non-limiting embodiment, the donor moiety includes a structure of (VI) or a salt thereof; wherein each of $R^D$ is, independently, H, optionally substituted alkyl, heteroalkyl, cycloalkyl, alkoxy, alkylcarbonyloxy, amino, aryl, alkaryl, alkanoyl, thioalkoxy, thioaryloxy, thioalkaryl, thioalkheterocyclyl, or hydroxyl (e.g., in which at least one $R^D$ is not H); and each d is, independently, an integer from 1 to 3 (e.g., 1 to 2 or 2 to 3).

In one non-limiting embodiment, the donor moiety includes a structure of (VII) or a salt thereof; wherein $R^4$ is H, optionally substituted alkyl, heteroalkyl, cycloalkyl, aryl, alkaryl, or alkanoyl.

Yet further donor moieties can include, e.g., 1,5-dialkoxynaphthalene (Dan); 1,3,5-benzenetriamine (TAB); 1,4-diphenylbutadiene; 1-methylnaphthalene; 1-naphthol; 1-naphthylamine; 13,14-dithiatricyclo[8.2.1.0$^{4,7}$]tetradeca-4,6,10,2-tetraene (DDDT); 2,4,6-tris(dimethylamino)-1,3,5-triazine (TDT); 2-methylnaphthalene; 2-naphthol; 2-naphthylamine; acenaphtene; anthracene; benzene; bromodurene; dibenzo[c,d]phenothiazine; durene; durenediamine (DAD); fluoranthene; fluorene; hexamethylbenzene (HMB); indene; indole and substituted indoles; N,N,N',N'-tetramethyl-p-phenylenediamine (TMPD); N,N-dibenzyl-m-toluidine; N,N-dimethylaniline (DMA); naphthalene and substituted naphthalenes; nucleic acid bases; p-phenylenediamine (PD); pentamethylbenzene; phenanthrene; pyrene; tetrakis(dimethylamino)ethylene (TDAE); tetralin; tetrathiotetracene; triethylammonium (TEA); and triphenylmethanol, as well as salts thereof.

Figure 20B:
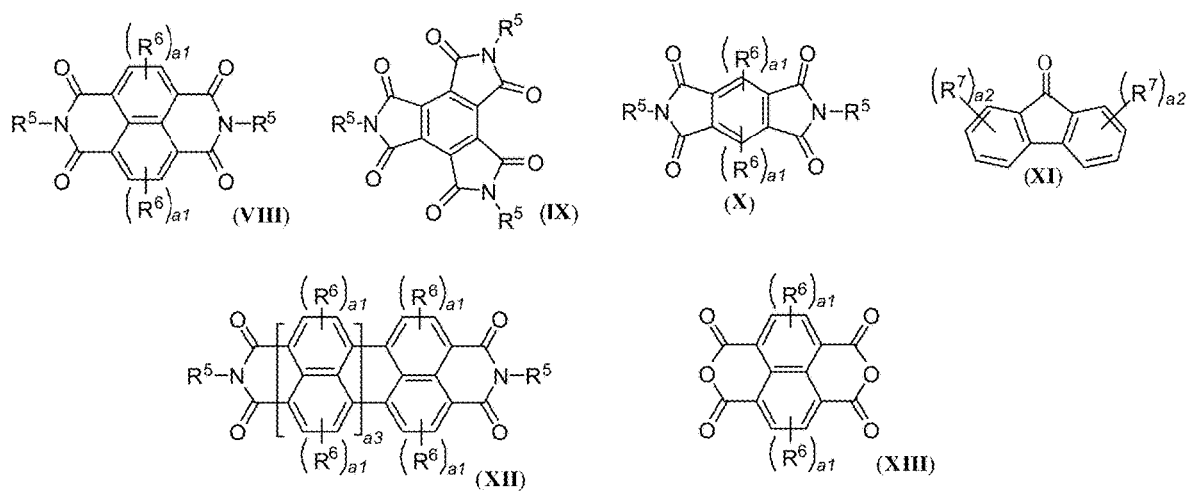

FIG. 20B provides exemplary structures for an acceptor moiety, including a structure of any one of (VIII), (IX), (X), (XI), (XII), and (XIII), or a salt thereof. For any of these structures, each $R^5$ can be H, optionally substituted alkyl, heteroalkyl, cycloalkyl, aryl, alkaryl, or alkanoyl. For these structures, exemplary $R^6$ (e.g., for (VIII), (X), (XII), and (XIII), or a salt thereof) can include H, optionally substituted alkyl, heteroalkyl, cycloalkyl, aryl, or alkaryl; and/or each of a1 and a2 is, independently, an integer from 0 to 4 (e.g., 0 to 1, 0 to 2, 0 to 3, 0 to 4, 1 to 4, 1 to 3, 1 to 2, 2 to 3, 2 to 4, and 3 to 4); and/or a3 is an integer from 0 to 5. For these structures, exemplary $R^7$ (e.g., for (XI), or a salt thereof) can include H, halo, nitro, or cyano.

In one non-limiting embodiment, the acceptor moiety includes a structure of (VIII) or a salt thereof; wherein each $R^5$ is, independently, H, optionally substituted alkyl, heteroalkyl, cycloalkyl, aryl, alkaryl, or alkanoyl; each $R^6$ is, independently, H, optionally substituted alkyl, heteroalkyl, cycloalkyl, aryl, or alkaryl; and each of a1 is, independently, an integer from 1 to 2. In one non-limiting embodiment, the acceptor moiety includes a structure of (IX) or a salt thereof; wherein each $R^5$ is, independently, H, optionally substituted alkyl, heteroalkyl, cycloalkyl, aryl, alkaryl, or alkanoyl.

In one non-limiting embodiment, the acceptor moiety includes a structure of (X) or a salt thereof; wherein each $R^5$ is, independently, H, optionally substituted alkyl, heteroalkyl, cycloalkyl, aryl, alkaryl, or alkanoyl; each $R^6$ is, independently, H, optionally substituted alkyl, heteroalkyl, cycloalkyl, aryl, or alkaryl; and each a1 is 1.

In one non-limiting embodiment, the acceptor moiety includes a structure of (XI) or a salt thereof; wherein each $R^7$ is, independently, H, halo, nitro, or cyano; and each a2 is, independently, an integer from 1 to 4 (e.g., 1 to 3, 1 to 2, 2 to 3, 2 to 4, and 3 to 4).

In one non-limiting embodiment, the acceptor moiety includes a structure of (XII) or a salt thereof; wherein each $R^5$ is, independently, H, optionally substituted alkyl, heteroalkyl, cycloalkyl, aryl, alkaryl, or alkanoyl; each $R^6$ is, independently, H, optionally substituted alkyl, heteroalkyl, cycloalkyl, aryl, or alkaryl; each of a1 is, independently, an integer from 1 to 2; and a3 is an integer from 0 to 5.

In one non-limiting embodiment, the acceptor moiety includes a structure of (XIII) or a salt thereof; wherein each $R^6$ is, independently, H, optionally substituted alkyl, heteroalkyl, cycloalkyl, aryl, or alkaryl; and each of a1 is, independently, an integer from 1 to 2.

Yet further acceptor moieties include, e.g., 1,4,5,8-naphthalene tetracarboxylic diimide (Ndi); 1,2,4,5-tetracyanobenzene (TCNB); 1,3,5-tricyanobenzene; 1,3,5-trinitrobenzene (TNB); 1,3,7,9-tetramethyluric acid (TMU); 1,4-dicyanobenzene; 1,4-naphthoquinone; 11,11,12,12-tetracyanonaphtho-2,6-quinodimethane (TNAP); 2,2-diphenyl-1-picrylhydrazyl (DPPH); 2,3-dichloro-5,6-dicyanobenzoquinone (DDQ); 2,3-dichloro-p-benzoquinone; 2,3-dicyano-p-benzoquinone; 2,4,5,7-tetranitro-9-fluorenone (TENF); 2,4,6-trinitrotoluene (TNT); 2,4,6-trinitroxylene; 2,4,7-tetranitro-9-fluorenylidenemalononitrile; 2,4,7-trinitro-9-fluorenone (TNF); 2,4-dinitro-9-fluorenone; 2,5-bis(methylamino)-p-benzoquinone (BAQ); 2,5-diethoxy-p-benzoquinone (DEQ); 2,6-dibromo-p-benzoquinone; 2,6-dinitro-p-benzoquinone; 3,4-benzopyrene (BP); 7,7,8,8-tetracyanoquinodimethane (TCNQ); 9,10-anthraquinone; 9-fluorenylidenemalononitrile; benzoquinone; benzotrifuroxan (BTF); dibromopyromellitic dianhydride; pyromellitic diimide (Pdi); dinitrobenzene; dinitronaniline; dinitrophenol; duroquinone; hexacyanobutadiene (HCBD); w-dinitrobenzene; maleic anhydride; mellitic trianhydride; nitrobenzene; o-dinitrobenzene; p-benzoquinone; p-dinitrobenzene; phenanthroquinone; phthalic anhydride; prioric acid; proflavin; promellitic dianhydride (PMDA); tetrabromo-o-benzoquinone (o-bromanil); tetrabromo-p-benzoquinone (bromanil); tetrachloro-o-benzoquinone (o-chloranil); tetrachloro-p-benzoquinone (chloranil); tetrachlorophthalic anhydride (TCPA); tetracyano-p-benzoquinone; tetracyanoethylene (TCNE): and tetraiodo-p-benzoquinone (iodanil), as well as salts thereof.

Combinations of a donor moiety and an acceptor moiety can be determined in any useful manner. In one embodiment, a combination of the donor and acceptor moieties is characterized by one or more optical adsorption properties that enable melting within the film or desired thermal device (e.g., at a reasonable rate, such as a rate of from about of 0.5° C./min to about 10° C./min (e.g., from 0.5° C./min to 1° C./min, 0.5° C./min to 5° C./min, 0.5° C./min to 7° C./min, 1° C./min to 5° C./min, 1° C./min to 7° C./min, 1° C./min to 10° C./min, 2° C./min to 5° C./min, 2° C./min to 7° C./min, 2° C./min to 10° C./min, 15° C./min to 7° C./min, or 5° C./min to 10° C./min). In another embodiment, a combination of the donor and acceptor moieties is characterized by the formation of desired aligned columnar domains (or the elimination of the domains) at a rate in the system chosen. In yet another embodiment, a combination of the donor and acceptor moieties is characterized by the generation of domains having appropriate optical properties once imaged to generate a readable code.

Further exemplary CT material can include one or more donors or acceptors having a core structure, in which the core structure can be substituted (e.g., with one or more moieties, such as those including optionally substituted alkyl (e.g., linear or branched forms thereof), heteroalkyl, alkoxy, alkoxyalkyl, alkylcarbonyloxy, alkoxycarbonyl, cycloalkyl, aryl, alkaryl, nitro, amino, thio, thioalkyl, hydroxyl, and cyano, as well as one or more optional substitutions described herein for alkyl). Exemplary core structures can include benzene, pyridine, triazine, triphenylene, diazatriphenylene, hexaazatriphenylene, pyrene, dibenzo[g,p]chrysene, dibenzonapthacene, tristriazolotriazine, rufigallol, truxene, triazatruxene, triindole, tricycloquinazoline (TCQ), hexaazatrinaphthylene (HATNA), perylene, parylene diimide, coronene diimide, phthalocyanine (Pc), porphyrin, quinoxalinophenanthrophenazine (TQPP), pyrazinopyrazinoquinoxalinophenanthrophenazine (TPPQPP), dodecaazatrianthracene (DATAN), hexa-peri-hexabenzocoronene (HBC), triangular graphene, and superphenaline (C96).

Yet further CT materials include a complex between an electron-rich 1,5-dialkoxy-naphthalene (Dan) with an electron-deficient 1,4,5,8-naphthalene tetracarboxylic diimide (Ndi). The complex can include two separate chemical moieties, in which the first chemical moiety includes a Dan and the second chemical moiety includes an Ndi. Alternatively, the complex can include two chemical moieties bound by one or more linkers (e.g., an optionally substituted alkylene, heteroalkylene, etc.), such as an Dan-Lk-Ndi or -(Dan-Lk-Ndi)N—, in which N is of from about 1 to 10 and Lk is a linker (e.g., an optionally substituted alkylene, heteroalkylene, etc., as well as any described herein). In some non-limiting embodiments, the CT material includes a compound having a formula of —[—$X^D$-Lk-$X^A$—]—, where $X^D$ is a donor moiety (e.g., any described herein) or an electron donor stacking unit; $X^A$ is an acceptor moiety (e.g., any described herein) or an electron acceptor stacking unit; and Lk is a linker.

Exemplary linkers include an optionally substituted alkylene, an optionally substituted heteroalkylene, —$(CH_2)_n$—$X_m$—$(CH_2)_p$—, and —$(CH_2)_n$—$X_m$—$Y_o$—$X_m$—$(CH_2)_p$— where each of X and Y is, independently, a linking unit group, n is 0-10, m is 0-20, o is 0-20, and p is 0-10 (e.g., in which the sum of n, m, o, and p must be equal to or greater than 1; or in which the sum of n, m, and p must be equal to or greater than 1). Exemplary linking unit groups include, e.g., an amino acid (e.g., aspartic acid), an amino acid derivative, a nucleic acid, a nucleic acid derivative, a saccharide, a polysaccharide, an amide, an ester, an ether, a phosphate diester, an amine, an imine, a thioether, a ketone, a carbonate, a carbamate, a urea, a guanidinium group, a thiourea, a thioester, a sulfone, a sulfoxide, an alkylene group, an alkenyl group, an alkynyl group, a glycol, a polyglycol, or a heteroalkylene group, in which each of X and Y can be independently substituted (e.g., with an alkyl group, an alkenyl group, an alkynyl group, a hydroxyl group, an aryl group, a cycloalkyl group, a thiol, an amine, a carboxy group, an amide urea, a thiourea, a carbonate group, a carbamate group, an ether, a thioether, a nitro group, a ketone, an aldehyde, a sulfone, a sulfoxide, a thioether, a heterocycle, a carbohydrate, a nucleic acid, an amino acid, a poly amine alkyl group, a phosphate, or a phosphonium group).

Further CT materials, donors, and acceptors are described in Leight K R et al., "Predictable tuning of absorption properties in modular aromatic donor-acceptor liquid crystals," *Chem. Mater.* 2012; 24:3318-28; Be A G et al., "Strongly dichroic organic films via controlled assembly of modular aromatic charge-transfer liquid crystals," *Org. Lett.* 2015; 17:4834-7; Alvey P M et al., "A systematic study of thermochromic aromatic donor-acceptor materials," *J. Org. Chem.* 2010; 75:7682-90; Reczek J J et al., "Tunable columnar mesophases utilizing $C_2$ symmetric aromatic donor-acceptor complexes," *J. Am. Chem. Soc.* 2006; 128:7795-8002; Van Winkle M et al., "Laser rewritable dichroics through reconfigurable organic charge-transfer liquid crystals," *Adv. Mater.* 2018; 30:e1706787 (6 pp.) and Supporting Information (10 pp.); Kaafarani B R, "Discotic liquid crystals for opto-electronic applications," *Chem. Mater.* 2011; 23:378-96; Reczek J J, "Aromatic electron donor-acceptor interactions in novel supramolecular assemblies," *Ph. D. dissertation, University of Texas, Austin,* 2006 (205 pp.); and International Patent Publication No. WO 97/43289, each of which is incorporated herein by reference in its entirety.

The CT material can be characterized by the ability to transition between an isotropic state and an anisotropic state. Alternatively, the CT material can include regions, in which each region can be in an isotropic state (e.g., as in an isotropic region) and an anisotropic state (e.g., as in an anisotropic region). Isotropy and anisotropy can be determined in any useful manner.

In one non-limiting instance, isotropy can be characterized by a lack of dichroism (e.g., showing no measurable difference in CT absorption on rotation of a linearly polarized light source). For instance, an isotropic region can be characterized by a measured absorbance (e.g., at any useful wavelength or range of wavelength, such as of from about 450 nm to 650 nm) exposed to linearly polarized light orthogonal in the x, y plane at 0° and at 90°, in which the measured absorbance is independent of the orientation of the light source.

In one non-limiting instance, anisotropy can be characterized by a measurable degree of dichroism (e.g., showing a measurable difference in CT absorption on rotation of a linearly polarized light source). For instance, an anisotropic region can be characterized by a measured absorbance (e.g., at any useful wavelength or range of wavelength, such as of from about 450 nm to 650 nm) exposed to linearly polarized light orthogonal in the x, y plane at 0° and at 90°, in which the measured absorbance is dependent of the orientation of the light source.

In another non-limiting instance, anisotropy and isotropy can be characterized by a dichroic ratio (e.g., a maximum dichroic ratio, as determined by a ratio of the transmission of linearly polarized light in a region of the CT material at a first transmission vector that provides maximum absorbance and at a second transmission vector that provides minimum absorbance, in which transmission or absorbance is determined at a maximal absorbance wavelength for the CT material). In particular embodiments, a transmission vector (in degrees) is the polarization angle of the linearly polarized light that is exposed to the CT material, as compared to the director or other initial orientation. The first and second transmission vectors can be any useful angle (e.g., a first transmission vector of about 0° and the second transmission vector of about 90°, or a first transmission vector of about 0° and the second transmission vector of about 45°), and the difference between the first and second transmission vectors can be any useful amount (e.g., a difference of about 20°, 30°, 45°, 60°, or 90°).

In other embodiments, a dichroic ratio is a ratio of absorption of light along two different axes (e.g., along a first axis of light that is polarized parallel to a director vector (e.g., as determined by absorbance at a particular wavelength) and along a second axis of light that is polarized perpendicular to a director vector (e.g., as determined by absorbance at a particular wavelength). In some embodiments, the dichroic ratio (e.g., a maximum dichroic ratio) of an anisotropic region is greater than about 10 or 20. In other embodiments, the dichroic ratio (e.g., a maximum dichroic ratio) of an anisotropic region is of from about 5 to about 30 (e.g., of from 5 to 10, 5 to 15, 5 to 20, 5 to 25, 10 to 15, 10 to 20, 10 to 25, 10 to 30, 15 to 20, 15 to 25, 15 to 30, 20 to 25, 20 to 30). In some embodiments, the dichroic ratio (e.g., a maximum dichroic ratio) of an isotropic region is less than about 5. In other embodiments, the dichroic ratio (e.g., a maximum dichroic ratio) of an isotropic region is of from about 1 to about 5 (e.g., of from 1 to 1.5, 1 to 2, 1 to 2.5, 1 to 3, 1 to 3.5, 1 to 4, 1 to 4.5, 1.2 to 1.5, 1.2 to 2, 1.2 to 2.5, 1.2 to 3, 1.2 to 3.5, 1.2 to 4, 1.2 to 4.5, 1.2 to 5, 1.5 to 2, 1.5 to 2.5, 1.5 to 3, 1.5 to 3.5, 1.5 to 4, 1.5 to 4.5, 1.5 to 5, 2 to 2.5, 2 to 3, 2 to 3.5, 2 to 4, 2 to 4.5, 2 to 5, 2.2 to 2.5, 2.2 to 3, 2.2 to 3.5, 2.2 to 4, 2.2 to 4.5, 2.2 to 5, 2.5 to 3, 2.5 to 3.5, 2.5 to 4, 2.5 to 4.5, 2.5 to 5, 3 to 3.5, 3 to 4, 3 to 4.5, 3 to 5, 3.2 to 3.5, 3.2 to 4, 3.2 to 4.5, 3.2 to 5, 3.5 to 4, 3.5 to 4.5, 3.5 to 5, 4.2 to 4, 4.2 to 4.5, 4.2 to 5, or 4.5 to 5).

Thermal Heat Sources, Including Optical Sources

The present invention can include the use of a thermal heat source (e.g., an optical source) to pattern a film. Exemplary thermal heat sources include an optical source, a laser (e.g., a solid-state laser, a semiconductor laser, a diode laser, a fiber laser, etc.), a flash exposure source, a flash lamp, an optical element, a heat lamp (e.g., an infrared lamp), a thermal print head, a thermal transfer printer, a thermal element, or a thermal heat stamp. A thermal source can have any useful operating wavelength, such as of from about 500 nm to about 1000 nm or in the ultraviolet, visible, near-infrared, or infrared wavelengths (e.g., a Ti:sapphire laser operating at about 750 nm; or a Nd:YAG laser operating at 1064 nm or 532 nm).

A thermal heat source (e.g., an optical source) can be used in conjunction with a mask, such as a thermal mask, an optical mask, or a light modulator. Such masks can be employed to expose and/or cover portions of a film prior to exposure to a thermal heat source, which can cause thermal melting of regions. Exemplary light modulators include a liquid crystal module (LCM, such as a liquid crystal display LCD, including a transmission LCD or a reflection LCD) or a digital micromirror device (DMD), optionally including a polarizing element (e.g., a polarizing mirror) or a diffraction grating (e.g., an amplitude grating).

Methods

The present invention relates, in part, to use of a film (e.g., any described herein) to produce an optical code. Exemplary methods can include steps of writing and reading an optical code (e.g., any steps herein). Further steps can include providing an optical pattern in any useful form (e.g., an optically readable matrix, a binary-coded datum, a bar code, a matrix of cells, microscopic data spots, an interaction code, etc., optionally including one or more positioning symbols) and then writing areas of the pattern (e.g., including regions, elements, symbols, codes, areas, cells, data pixels, lines, spots, etc.) into the film (e.g., by exposing to an optical source or by thermally melting the film). Exemplary optical patterns, optically readable matrices, two-dimensional optical codes, optical readers, and coding methods are described in U.S. Pat. Nos. 5,288,986, 5,726,435, 5,920,062, 5,992,748, 6,267,296, 6,318,633, 6,550,685, 6,752,316, 7,198,194, 7,619,607, 7,648,072, 8,272,038, 8,573,499, 9,594,937, and 9,911,072, as well as U.S. Pat. Pub. Nos. 2006/0215913 and 2013/0240627, each of which is incorporated herein by reference in its entirety.

EXAMPLES

Example 1: Optically Reconfigurable Charge-Transfer (CT) Liquid Crystals

Herein, we describe a new class of functional, optically writable and rewritable materials built from organic charge-transfer (CT) liquid crystals. CT-based organic materials are increasingly considered for wide-ranging applications including energy transducers, photo-electrics, ferro- and piezo-electrics, and ambipolar charge transfer layers. The ability to optically reconfigure both the aniostropy and polarization of thin films could be pertinent for various applications, including displays, smart authentication, and data storage/retrieval.

Liquid crystals (LCs) have been ubiquitous in display technologies, operating as stimuli responsive polarizers largely based on controlled ordering of calamitic (rod-shaped) LCs. Recently, a sub-class of multi-component, columnar phase liquid crystals (CLCs) has attracted substantial investigation due to their broad potential as self-assembling and self-healing absorbers, semiconductors, and potentially room temperature ferroelectrics (see, e.g., Tayi A S et al., "Room-temperature ferroelectricity in supramolecular networks of charge-transfer complexes," *Nature* 2012; 488:485-9). These materials can exhibit synergistic charge-transfer (CT) behaviour (e.g., band gap) that is tunable via simple mixing of donor/acceptor moieties, and as we have recently shown, the anisotropic nature of this CT absorption can be manipulated to form inherently dichroic films (see, e.g., Be A G et al., "Strongly dichroic organic films via controlled assembly of modular aromatic charge-transfer liquid crystals," *Org. Lett.* 2015; 17:4834-7; and Leight K R et al., "Predictable tuning of absorption properties in modular aromatic donor-acceptor liquid crystals," *Chem. Mater.* 2012; 24:3318-28).

Figure 3:
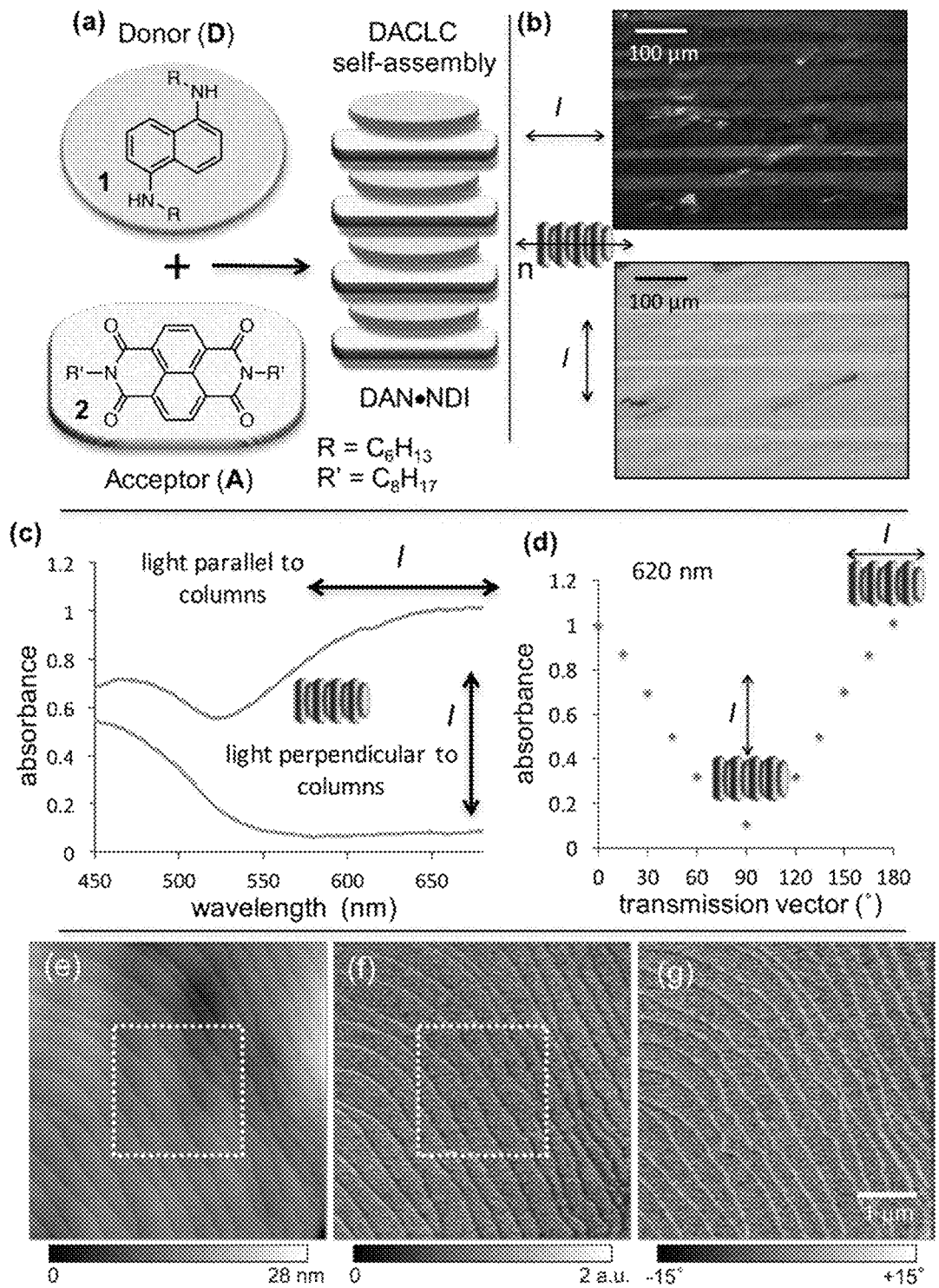
FIG. 3 shows exemplary data regarding a CT material that is a donor-acceptor columnar liquid crystal (DACLC) material including a diaminonaphthalene (DAN) moiety and a naphthalenediimide (NDI) moiety. Provided are (a) a schematic of the self-assembly of an exemplary DAN moiety (compound 1) and an exemplary NDI moiety (compound 2); and (b,c) linearly polarized light (LPL) microscopy images and corresponding absorption spectra of a thin DACLC film with the electric field vector (I) oriented parallel (top) and perpendicular (bottom) to the director n of columnar alignment. Spectra were acquired at ambient temperature (22° C.). Also provided are (d) variation in CT absorption with the rotation of 620 nm LPL showing a maximum difference at 90° and a dichroic ratio >20; and piezo force microscope images of (e) topography, (f) piezoelectric amplitude, and (g) phase.

By taking advantage of the functionality and chemical malleability of multi-component CLCs, we have developed an optically rewritable (OWR) material with unprecedented dichroic control. In one non-limiting embodiment, the ORW method is accomplished through fine manipulation of the molecular order and alignment of the columnar director (n) in synthesized thin films of mixed-stack donor-acceptor columnar liquid crystals (DACLCs) (see, e.g., FIG. 3). Understanding the dynamic relationship between the isotropic Cob thermal phase transition and alignment of this CT-CLC enables laser-induced melting with controlled temperature gradients that direct columnar alignment.

Figure 10:
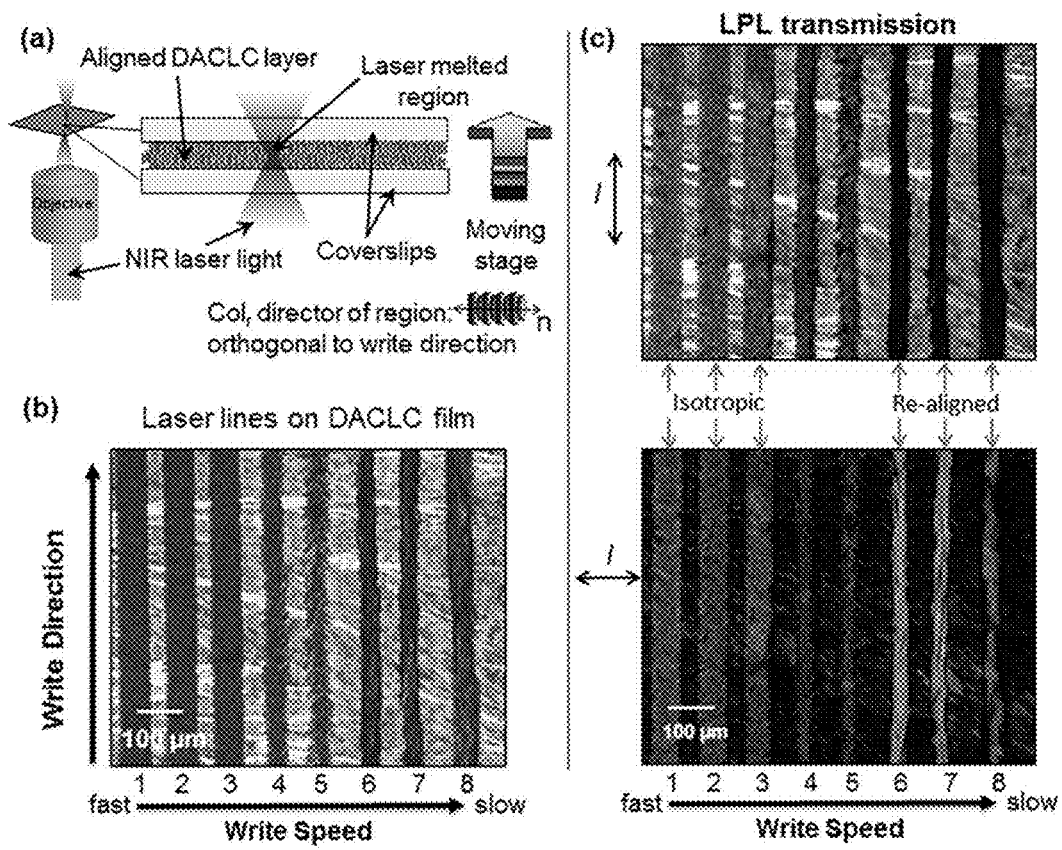
FIG. 10 shows the effect of laser exposure to pattern an exemplary CT material. Provided are (a) a schematic of the laser direct write set up, in which a 750 nm continuous wave beam is focused into a horizontally aligned region of a DAN•NDI thin film to induce liquefaction at the laser spot; and b) a microscopy image of directional scanning with the laser, which induces clearly demarcated laser lines at multiple scanning speeds (>1 to <0.2 mm $s^{-1}$). Also provided are (c) LPL microscopy images of the written region with I oriented parallel (top) and perpendicular (bottom) to the direction of laser movement. Scan speeds of >0.5 mm $s^{-1}$ (lines 1-3) result in lines showing no dichroism (isotropic) while scan speeds <0.5 mm $s^{-1}$ (lines 6-8) result in a reoriented DACLC line with an axis of polarization in the direction of scanning.

In particular embodiments, fast laser scanning induced a sharp temperature gradient that leads to flash-cooling of the DACLC resulting in no long-range molecular order, with written areas becoming completely isotropic. Slower scanning leads to a sustained thermal gradient that realigns the Cob director, and the subsequent polarization axis of the region, exactly in the direction of laser movement (see, e.g., FIG. 10). Using this simple mechanism (see, e.g., FIG. 12A-12B), the columnar alignment and hence CT-based dichroism can be patterned intentionally and repeatedly, as we demonstrate (see, e.g. FIGS. 15,17). We also show that laser-ordered regions of the DACLC material exhibit significant piezoelectric behavior, a functional property not previously reported in these materials. Additional details follow.

Example 2: Laser Rewritable Dichroics Through Reconfigurable Organic Charge-Transfer Liquid Crystals Charge-transfer materials based on the self-assembly of aromatic donor-acceptor complexes enable a modular organic-synthetic approach to develop and fine-tune electronic and optical properties, and thus these material systems stand to impact a wide range of technologies. Through laser-induction of temperature gradients, in this study, user-defined patterning of strongly dichroic and piezoelectric organic thin films composed of donor-acceptor columnar liquid crystals is shown. Fine, reversible control over isotropic versus anisotropic regions in thin films is demonstrated, enabling noncontact writing/rewriting of micropolarizers, bar codes, and charge-transfer based devices.

The ability to position and reconfigure the order and alignment of molecular and nanoscale materials is of interest for both fundamental and applied science, with applications that include self-healing/adaptive coatings [1], electrochromic [2] and thermochromic [3] materials, and photoresponsive films [4], For example, to realize the potential of technologies such as holography, photonic circuitry, and dynamic tagging and authentication requires an ability to customize electromagnetic wavefronts using external triggers such as light, heat, and electric fields. For these applications, several candidate material systems have begun to emerge including assemblies of anisotropic colloids and nanomaterials as well as organic liquid crystals (LCs). Though there have been considerable efforts focused on directing the assembly of inorganic nanoparticles [5], for many applications, organic molecular materials can provide greater chemical malleability and thus functional tunability while using abundant, inexpensive precursors and processing methods.

Indeed, since the development of liquid crystal displays in the 1960s, organic LCs have proven to be a versatile class of molecular materials with ubiquitous applications as stimuli responsive polarizers and sensors. Modern applications mainly employ calamitic LCs in nematic or smectic phases; however, the subclass of columnar liquid crystals (CLCs) has inspired researchers in recent decades to investigate their broad potential as self-assembling and self-healing absorbers, semiconductors, and potentially room temperature ferroelectrics [6].

Of particular note are bicomponent CLCs referred to as donor-acceptor columnar liquid crystals (DACLCs). DACLCs are formed from the self-assembly of complementary electron-rich and electron-poor aromatic components, resulting in thermotropic mesogenic materials comprised of alternating mixed-stack columns. These materials exhibit intense and broadly tunable charge-transfer (CT) absorbance in the visible-NIR, leading them to sometimes be referred to as CT liquid crystals [6b,7], Similar to recent CT cocrystalline analogs [6c,8], we have shown that the directional nature of the CT absorption can afford inherent dichroism in well-ordered thin films of DACLCs, with the polarization direction dependent on the molecular alignment of columnar structures [6b].

Given the malleability of mesophase orientation and the related tunability of dichroic absorption, we postulated that the molecular arrangement of DACLC films could be manipulated using a light-induced thermotropic mechanism. Indeed, this is the principle underlying some types of laser viewing cards, and is reminiscent of the phase-change mechanism used in rewritable storage media such as rewriteable compact disks. Using light to pattern DACLC alignment (e.g., versus electric fields) should simplify implementation for display and memory storage applications, providing a route to optically rewritable materials (OWR).

By exploiting the molecular alignment-dependent CT absorption of assembled films, here we show that laser direct write/rewrite can be used to generate both dichroic and isotropic regions by manipulating the heating/cooling dynamics of the constituent DACLCs film. This mechanism provides for simplified tuning of anisotropic properties and can be used to directly write optically active messages and complex patterns with micron-scale accuracy.

Historically, controlling the alignment of CLC materials has proven challenging [6a], The described method herein provides for fine control over both columnar orientation (versus non-oriented) and orientation direction, compared to methods of bulk alignment control (e.g., zone-casting, zone-melting, or use of a pretreated substrate) [9], Polarization is achieved without the use of common photosensitive anchoring layers, and the angle of polarization can be dictated pixel by pixel via the direct write mechanism [9,10], Additional details follow.

Example 3: Exemplary Experimental Methods

For experimental data provided herein, all commercial reagents and solvents were obtained from Sigma-Aldrich or Fischer Scientific and were used as purchased without additional purification. Compound 1 and 2 were synthesized following published procedures (see, e.g., Leight K R et al., "Predictable tuning of absorption properties in modular aromatic donor-acceptor liquid crystals," Chem. Mater. 2012; 24:3318-28). $^1$H and $^{13}$C NMR spectra were collected using a Bruker Avance 400 MHz spectrometer at 25° C. LPL microscopy was performed using an Olympus BX51TRF microscope and accessories from McCrone Microscopes in transmission mode on a Linkam large area thermal stage. Images were captured with a PAXCAM 3 camera. Thermal analysis data by DSC was collected on a Q20 instrument with an RSC cooling system from TA instruments. UV/Vis spectroscopy was performed on a JAZ-PX spectrophotometer from Ocean Optics. LPL UV/Vis spectroscopy was performed by fitting the JAZ-PX spectrophotometer directly to the Olympus BX51TRF microscope ocular. Variable temperature powder XRD was performed on an Angstrom Advanced Inc. ADX-2700 powder diffractometer with a monochromatic CuK$_{\alpha1}$ X-ray line and a modified Anton Paar ALTK-450 VT stage. Images shown in FIGS. 10, 15, and 17 were recorded using a Thorlabs color CCD camera (DCU224C) mounted on an inverted stage microscope illuminated using a single polarizer.

Mixture formation: DACLC mixtures were made by weighing out a 1.00:1.00 molar ratio of components (total mass ~100 mg), and then physically mixing with a spatula prior to melting with a heat gun. The resulting mixture was iteratively corrected with respect to the relative ratio using $^1$H NMR until integration of the respective donor and acceptor peaks gave a molar ratio of 1.00 to 1.00 (±0.02). Laser writing tests were performed on DACLC films made by sandwiching 1.0 mg of the material between substrates (usually clean glass slides), melting via heat gun, and then allow to cool at 2° C./min to room temperature. Average film thickness was 27 μm (±3 μm). Film thickness of written films did range in the extreme from 15-50 μm, but our writing method was not noticeably affected by any variation in film thickness.

Synthesis and characterization of N1,N5-dihexylnaphthalene-1,5-diamine (DAN, compound 1): In a round bottom flask, naphthalene-1,5-diamine (1.00 g, 6.32 mmol, Aldrich), 50 mL of acetone, and K$_2$CO$_3$ (5.24 g, 37.93 mmol, Fluka) were added. The reaction was refluxed and stirred for 30 minutes. Then, 1-bromohexane (6.78 g, 41.09 mmol, Aldrich) was added and continued to reflux for 72 hours. Acetone was removed in vacuo, and the crude product was purified by column chromatography in dichloromethane (DCM):hexanes (HEX) (7:3 Hex:DCM). The eluting solvent was removed in vacuo, and the product was further purified by crystallization in isopropanol to yield light-purple needle-like crystals of 1 (0.6 g, 30% yield). $^1$H NMR (CDCl$_3$, 400 MHz): δ 0.90 (t, J=7.88, 6H), 1.27-1.37 (m, 8H), 1.37-1.45 (m, 4H), 1.63-1.72 (m, 4H), 3.13-3.20 (m, 4H), δ 5.76 (t, J=4.72, 2H), δ 6.45 (d, J=7.04, 2H), δ 7.17 (t, J=9.4, 2H), δ 7.31 (d, 2H). $^{13}$C NMR (CDCl$_3$, 400 MHz): 14.03 (2C), 22.72 (2C), 27.12 (2C), 29.48 (2C), 31.66 (2C), 44.32 (2C), 104.30 (2C), 108.47 (2C), 123.93 (2C), 125.46 (2C), 144.27 (2C). Expected mass: 326.27, ESI-MS (negative-ion) measured mass: 326.3.

Synthesis and characterization of N,N-dioctyl-naphthalenediimide (NDI, compound 2): 1,4,5,8-Naphthalenetetracarboxylic dianhydride (1.0 g, 3.4 mmol) was placed into a round bottom flask and suspended in isopropanol (80 ml). A mixture of 1-aminooctane (1.6 g, 12.4 mmol), triethylamine (TEA, 1.3 g, 13 mmol), and isopropanol (30 ml) was slowly added, and the solution was allowed to stir at room temperature for 30 min and then heated at reflux for 16 hours. The solution was allowed to cool to room temperature, and the resulting precipitate was filtered and recrystallized in isopropanol to yield 2 (1.6 g, 94% yield) as off-white crystals. $^1$H NMR (CDCl$_3$, 400 MHz): δ 8.66 (s, 4H), 4.14 (t, J=7.5 Hz, 4H), 1.82 (p, J=7.2 Hz, 4H), 1.55-1.20 (m, 10H), 0.91 (t, J=6.9 Hz, 6H) ppm. Expected mass: 490.28, ESI-MS (negative-ion) measured mass: 490.3.

Laser patterning of DACLC films: Laser patterning was performed using a Ti:sapphire laser (Tsunami; Spectra Physics) with an output centered at 750 nm in continuous wave mode (not mode-locked). The beam was collimated and expanded to slightly overfill the back aperture of objectives situated on an inverted microscope. The laser power was adjusted using a half-wave plate/polarizing beam-splitter pair and the laser spot was translated across DACLC films using a motorized XY stage controller (Applied Scientific Instrumentation (ASI), MS-2000). For the images in FIGS. 15 and 17, the laser focus was raster scanned with an X/Y open frame scan head (Nutfield Technology) across a digital micromirror device used as a reflectance photomask.

Example 4: Characterization of DACLC Including DAN and NDI

Figure 4:
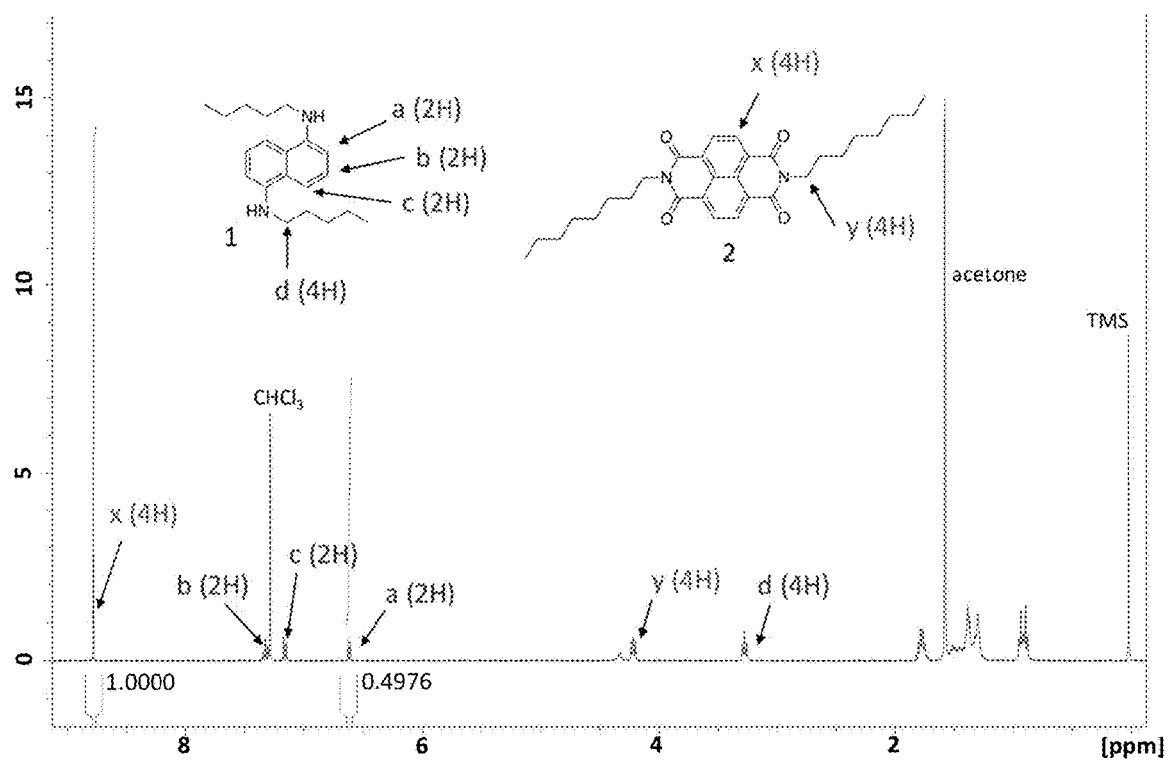
FIG. 4 shows a 400 MHz spectrum in $CDCl_3$ of a 1:1 molar ratio DACLC mixture of compounds 1 and 2 (DAN•NDI).
Figure 5:
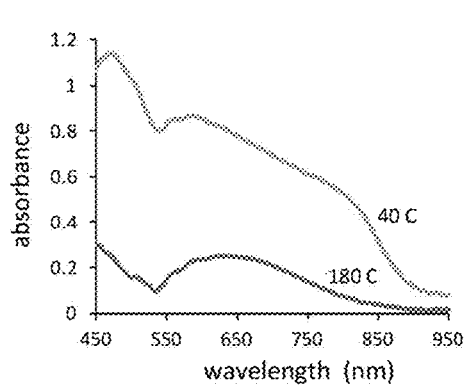
FIG. 5 shows variation in UV/Vis absorption of DAN•NDI in the room-temperature mesophase (at 40° C.) and cleared isotropic liquid phase (at 180° C.). The difference in absorption between the two phases at 650 nm and 750 nm laser irradiation X is 3× and 5×, respectively.
Figure 6:
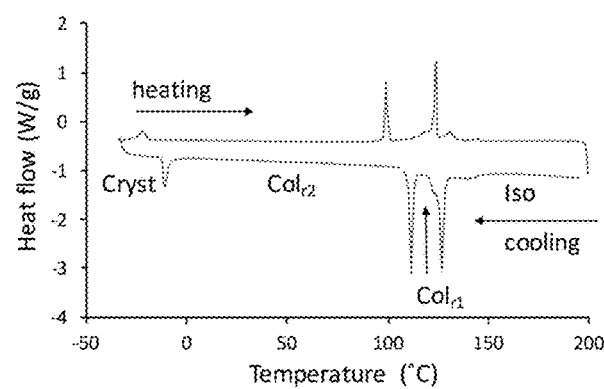
FIG. 6 shows differential scanning calorimetry (DSC) of DAN•NDI at a heating and cooling rate of 5° C./min.

We considered the DACLC material including a diaminonaphthalene moiety (compound 1) and a naphthalenediimide moiety (compound 2), which together provides a DAN•NDI film (FIG. 3(a) and FIG. 4) that displays a broad CT band of significant intensity ($\varepsilon_{CT}$=6800 M$^{-1}$ cm$^{-1}$)[7] that not only spans the UV-Vis range, but also reaches into the NIR region (FIG. 3(c) and FIG. 5). On slow cooling from the melt (−2.0° C. min$^{-1}$), films of DAN•NDI transition to a Colin (127° C.) and then Col$_{r2}$ (107° C.) phase with columns lying edge-on on the glass in relatively large ordered domains (FIGS. 6,7,8) [7], When exposed to linearly polarized light (LPL), CT excitation only occurs if the direction of the electric field vector (I) is parallel to the normal axis director (n) of the DACLC Cob phase, and so these well-ordered regions are strongly dichroic (FIG. 3b). The magnitude of transmission of polarized light in the CT region of DAN•NDI films varies significantly as the electric field vector rotates, resulting in a maximum dichroic ratio >20 at $\lambda_{CT\text{-}max}$ over a 90° change in LPL (FIG. 3b,d). This also unambiguously identifies the orientation of the Cob director in a film region as parallel to the LPL vector of max CT absorption.

Figure 9:
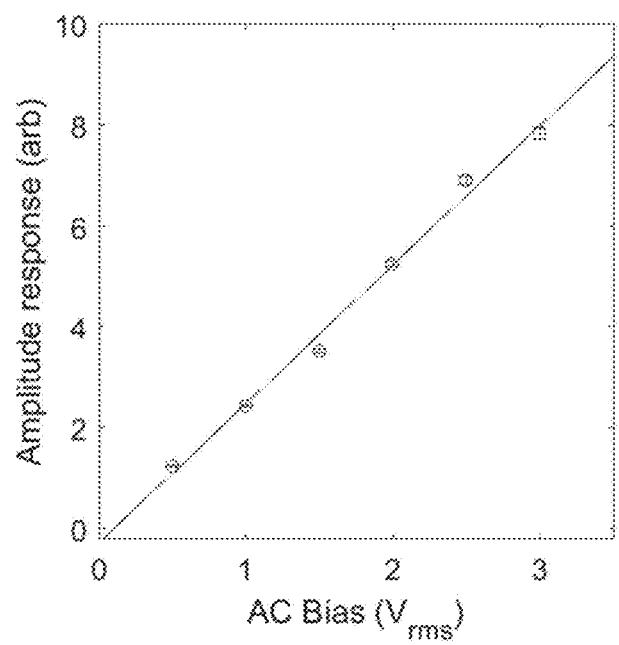
FIG. 9 shows a piezoelectric force microscopy study showing the linear relationship of the piezoelectric amplitude with applied voltage.

Based on the strong electromagnetic anisotropy of ordered regions, high resolution atomic and piezo force microscopy was performed on films assembled on a conductive substrate. FIG. 3e-g shows images of the topography, piezoelectric amplitude, and phase. Both piezoelectric signals are uniform across the surface, except at the step edges due to topographic crosstalk, confirming a homogeneous material lacking in-plane inversion domains. The piezoelectric response is linear with applied voltage (FIG. 9), indicative of a piezoelectric material. Prior to the images in FIG. 3e,f, the middle region of the image (marked by the white box) was scanned while applying a DC bias of +8 V. The lack of change of contrast in the amplitude signal observed under these conditions indicates a true piezoelectric response and not interaction with injected charges or other electromechanical coupling [11].

Example 5: Laser Writing on DAN•NDI Film

To investigate laser interactions with the DAN•NDI assemblies, a thin film was heated and cooled between two glass coverslips resulting in areas with ordered regions (FIG. 10a) and an average film thickness of 27±3 μm (measured via micrometry and profilometry). A 750 nm continuous wave laser beam was focused into the sample ($\varepsilon_{750}$=3650 $M^{-1}$ $cm^{-1}$), and the substrate was moved at various speeds to create the vertical lines shown in FIG. 10b.

Figure 11:
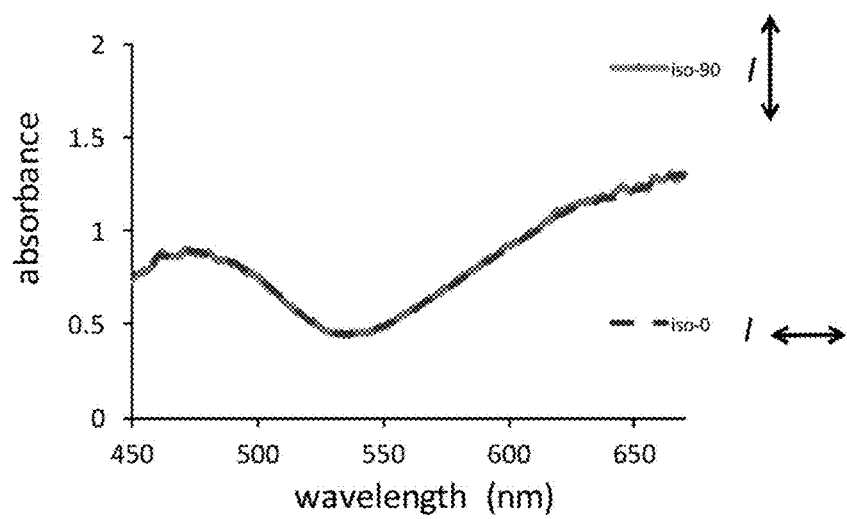
FIG. 11 shows two UV/Vis spectra of a fast-written, isotropic DACLC film exposed to linearly polarized light orthogonal in the x, y plane at 0° (dashed line) and 90° (solid line). The measured absorbance is identical regardless of LPL orientation, illustrating the optical isotropy.

At fast scan speeds (>0.5 mm $s^{-1}$; FIG. 10c, lines 1-5), the sample transitions to become completely isotropic in the wake of the laser spot, showing no measureable difference in CT absorption on rotation of LPL (FIG. 11). At slower speeds (<0.5 mm $s^{-1}$; FIG. 10c, lines 6-8), the material is reoriented, forming anisotropic regions with the columnar director and polarization axis of the CT band now aligned in the direction of laser movement.

Figure 7:
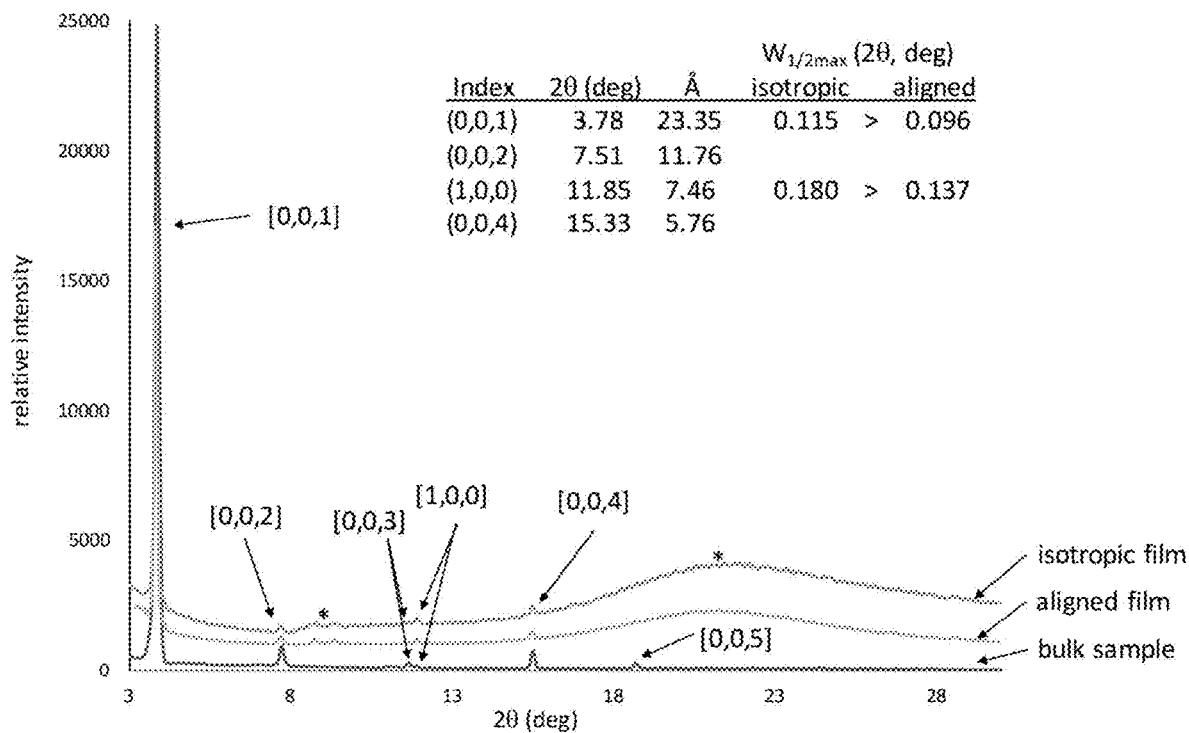
FIG. 7 shows powder XRD of DAN•NDI as a completely fast laser-written isotropic film (top spectrum), then the same film now written at a moderate speed and completely aligned (middle spectrum), and a bulk sample (bottom spectrum). Both the isotropic and aligned films show peaks that directly match the bulk sample, indicating a Cob phase structure with similar nanoscopic molecular packing in all three samples. The dominant peak at 2θ=3.78 (23.35 Å) is representative of DACLC mixtures incorporating NDI and is the (0,0,1) index relating to packing in the long axis of the NDI molecules (e.g., see FIG. 8). The peak at 2θ=11.85 (7.46 Å) is the (1,0,0) reflection corresponding to the expected distance of alternating columnar stacking between DAN-NDI-DAN (or NDI-DAN-NDI), with an average n-n stacking distance of 3.7 Å. The only other clearly discernable peaks are reflections of the (0,0,1). The peaks at 2θ=8.74, 9.31 and the broad peak at 2θ=~22 are background peaks due to the glass substrate and coverslip used to support the thin films.
Figure 8:
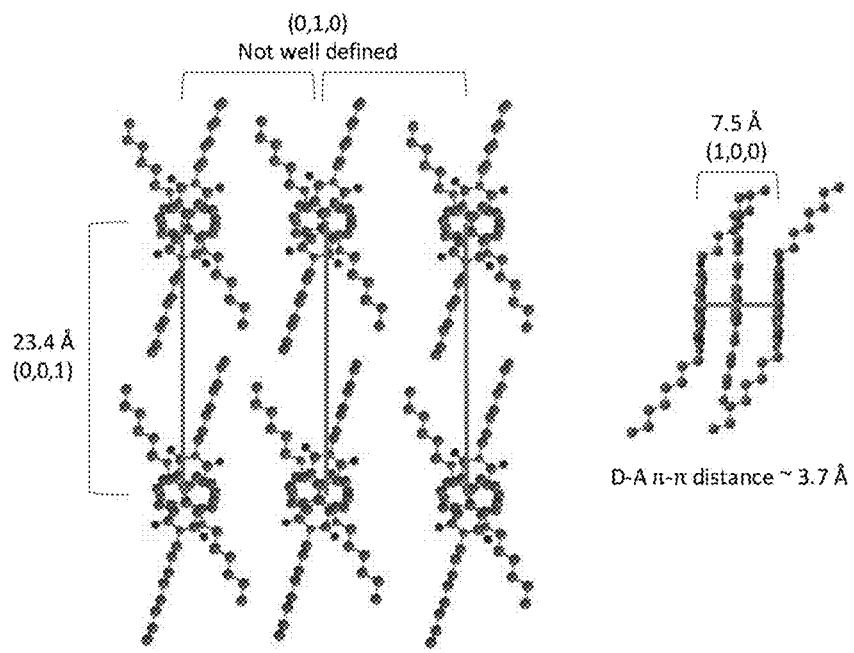
FIG. 8 provides a schematic showing a modeled representation (using Spartan '16 on Mac) of the molecular packing in the $Col_{r2}$ phase for DAN•NDI films based on the peaks observed in the powder-XRD spectra and the UV/Vis and LPL UV/Vis absorbance of the CT band.

The difference in morphology of the irradiated domains as a function of laser-writing speed may be explained by two factors: the overall cooling rate of melted regions and the shape and magnitude of the thermal gradient along the laser path. Interestingly, powder-XRD peak positions of both isotropic and aligned written film regions match the $Col_{r2}$ phase of the bulk sample (FIG. 7). While this confirms that molecular packing and phase identity are the same, isotropically written films show significantly broader peak widths than aligned films, most notably the (1,0,0) peak related to 7I-7I stacking. This is evidence of comparatively smaller domain sizes and less long-range columnar order in fast-write regions of DAN•NDI films.

Figure 12A:
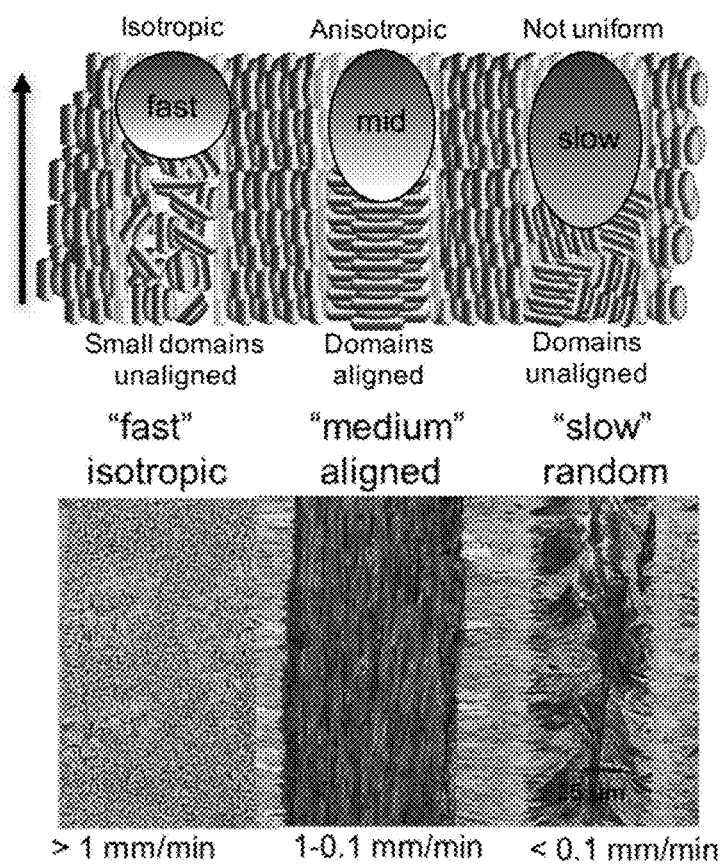
FIG. 12A-12B shows schematics of (A) supramolecular arrangement of DACLC domains resulting from different scan speeds and (B) a non-limiting mechanism for DACLC realignment at medium scan speeds. The shape of the temperature gradient could lead to orientation of the Coin director n in the direction of laser motion.
Figure 12B:
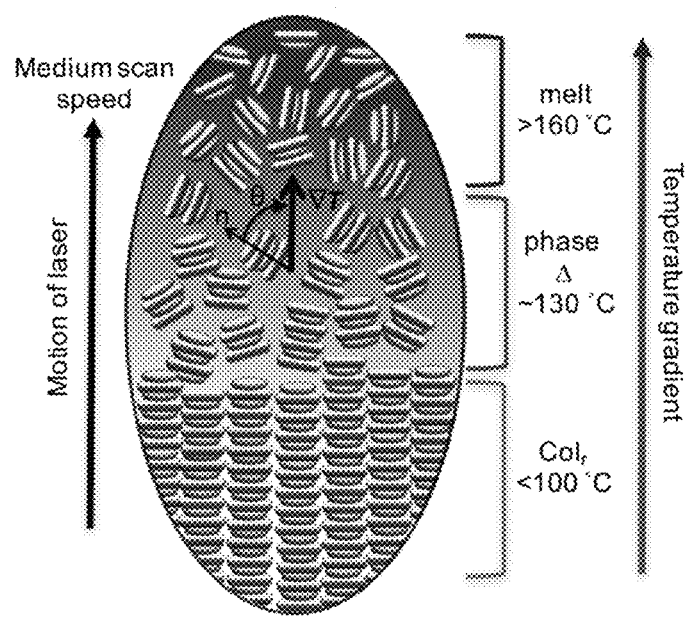

The ability to dictate the orientation of the Cob director along the direction of laser movement as a function of scan speed is related to the magnitude and spatial distribution of the laser-induced temperature gradient (FIG. 12A). Laser-induced melting likely produces an asymmetric temperature gradient in the direction of writing in the irradiated film. On transition from the isotropic liquid, this causes a torque (VT) to be applied to the assembling Cob director (n), acting to align the director parallel to the direction of the thermal gradient (FIG. 12B) [12].

Figure 13:
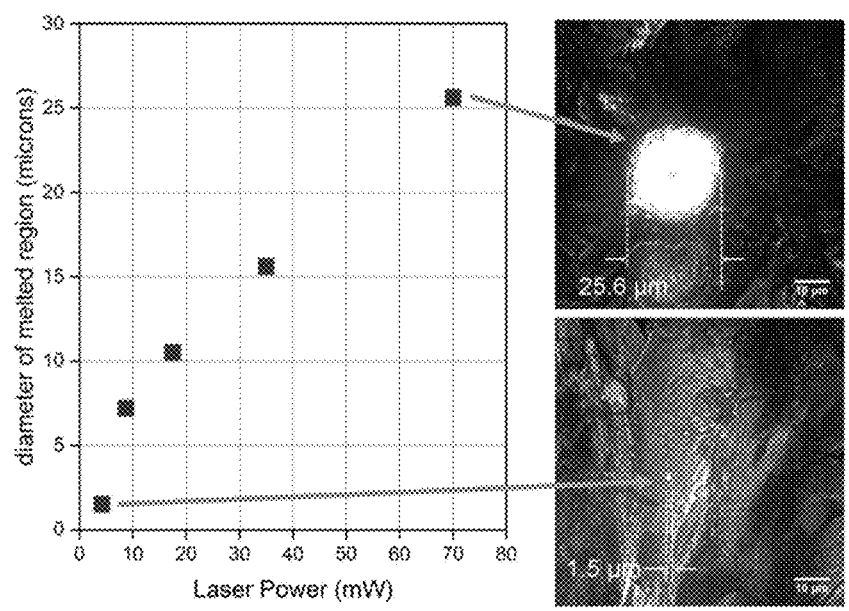
FIG. 13 shows the correlation of laser power with diameter of melted region.

The low $\varepsilon_{CT}$ in the liquid phase, and low thermal conduction of the DACLC material (on the order of 0.2 W $mK^{-1}$)[13], results in confined liquefaction of the DACLC film proximal to the laser spot, the size of which can be modulated via input power (FIG. 13). In the case of fast laser scanning (>0.5 mm $s^{-1}$), there is a sharp temperature drop between the immediate post-irradiated material and the surrounding film, resulting in rapid cooling of the melted regions to the Cob phase. This "flash-cooling" does not provide sufficient time for VT to act on the Cob director, inhibiting the formation of long-range columnar order. The resulting small, unaligned domains lead to optical isotropy in fast-written regions of the film.

Figure 14:
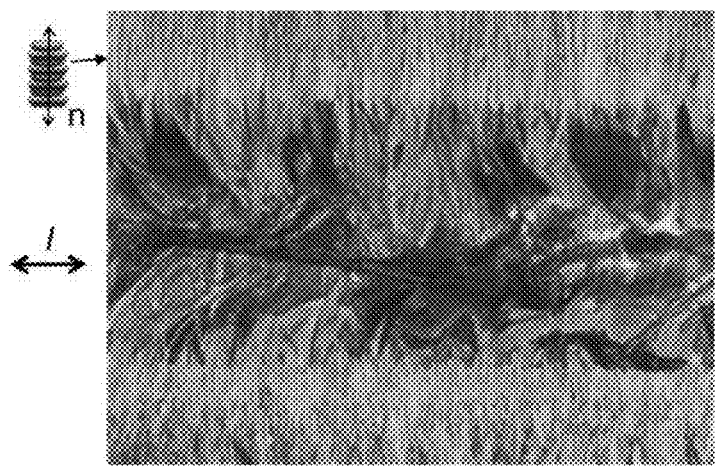
FIG. 14 shows an LPL microscope image (200× magnification) of a line written on a DAN•NDI film by translating the laser at slow speed (0.01 mm/s) horizontally. The sample region has a Cob director pre-aligned vertically. Non-uniform domain alignment is observed in the written region as indicated by the simultaneous appearance of dark patches (strong CT absorbance, domain director is oriented more horizontally) and light patches (weak CT absorbance, domain director is oriented more vertically).

At moderate writing speeds (0.1-0.5 mm $s^{-1}$), the irradiated area cools more gradually, allowing for elongation of ordered columnar regions in a sustained thermal gradient where VT is suitable to promote directed columnar growth and subsequent alignment of the CT band polarization axis parallel to the direction of laser movement. Slow scan speeds (<0.1 mm $s^{-1}$) allow for the growth of long-range ordered regions, but the spatial distribution of the thermal gradient is more dispersed outside the scan direction and thus is not sufficient to uniformly orient the director of the Cob, resulting in unaligned domain orientation (FIG. 12A and FIG. 14).

Figure 15:
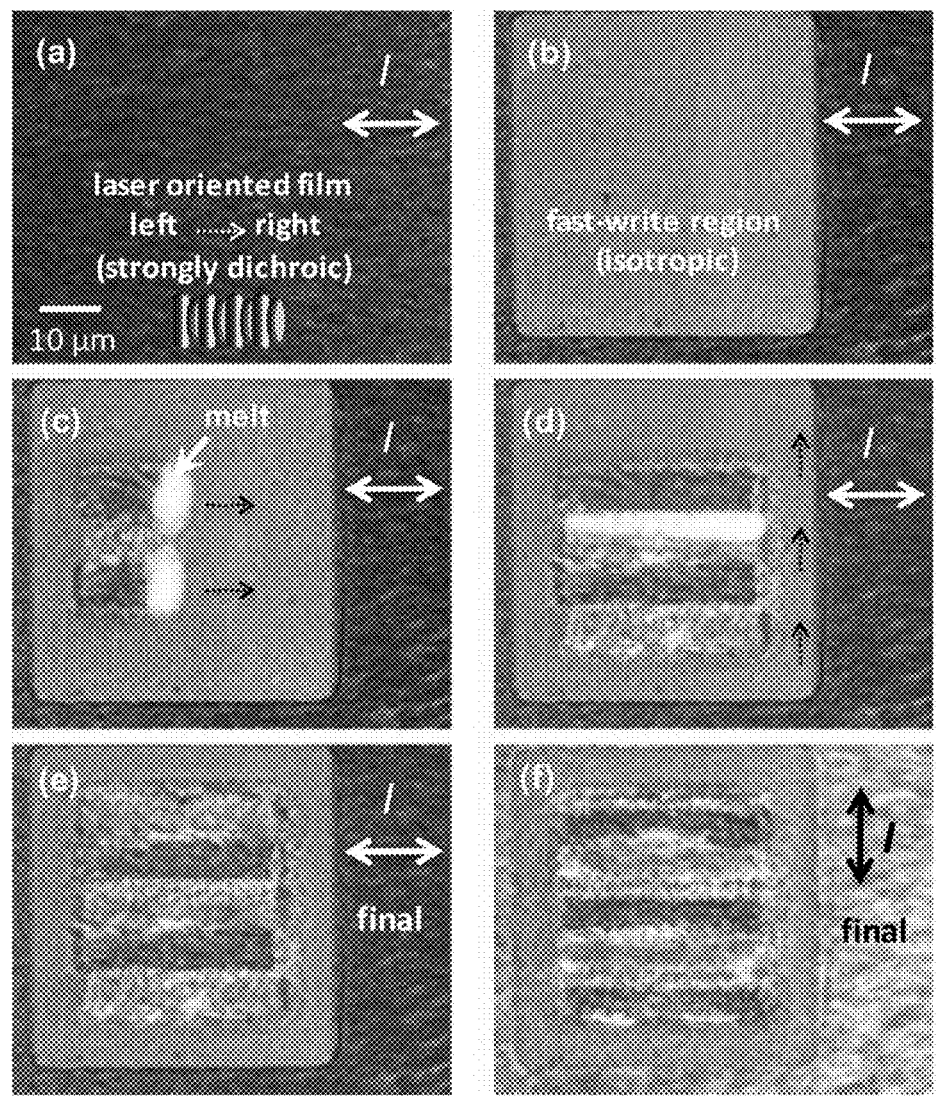
FIG. 15 shows LPL microscopy images illustrating an exemplary writing process for a DACLC thin film. Provided are images in which (b) fast scans are employed to produce isotropic regions and (a,c,d) moderate scans are employed to produce aligned regions with orientations dependent on scanning direction. Optical anisotropy of aligned regions is demonstrated in (e) and (f).

This mechanism enables two key properties to be patterned into the film: (1) the local isotropy/anisotropy and (2) the orientation of the anisotropic regions. This capability is demonstrated in FIG. 15. Here, a wide area of the DACLC film is aligned by moving a scanning laser line in relation to the substrate (e.g., the laser output is set to oscillate at 180 Hz using an XY galvo scanner, producing a vertical line, and this line is swept across the sample left to right by moving the sample in relation to the line at a "moderate speed"; 0.3 mm $s^{-1}$), resulting in a large region of horizontally oriented columnar domains (FIG. 15a).

A portion of this uniformly aligned area is then scanned at a fast rate, erasing the previous degree of order and producing an optically isotropic region (FIG. 15b). Subsequently, distinct regions of the sample are realigned left to right (FIG. 15c) and bottom to top (FIG. 15d) using moderate scan speeds (regions are patterned here by scanning the laser across a digital micromirror photomask [14]). When reading the region, rotating the angle of linearly polarized light by 90° highlights which areas of the sample are aligned and optically anisotropic following this process (FIG. 15e,f).

Figure 16:
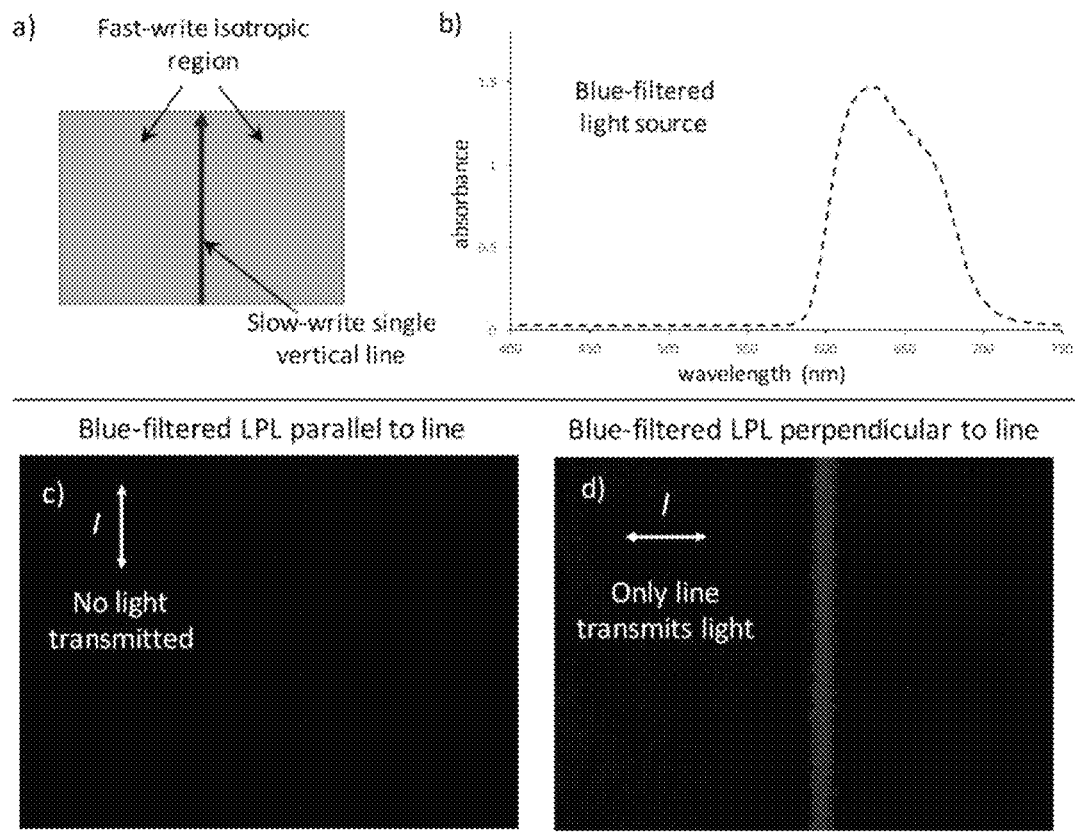
FIG. 16 shows contrast enhancement between aligned and isotropic DACLC regions by viewing with blue-filtered LPL light. Provided are (a) a schematic of a sample with a fast-write isotropic DAN•NDI region and a single anisotropic vertical line drawn; and (b) a spectrum of blue-filtered LPL light used to view the sample. Also provided are images (c) when the filtered LPL is oriented parallel to the polarization axis of the line, no light is transmitted; and (d) when the filtered LPL is oriented orthogonal to the polarization axis of the written line, light is only transmitted through the line.

Intrinsic for linear polarizers, transmittance contrast is highest by aligning regions orthogonally (FIG. 3d), and though the images shown here were acquired using a broadband light source, optical filters can greatly improve this contrast (FIG. 16). However, it is important to note that the gradation in magnitude of the dichroic ratio between 0 and 90 (FIG. 3d) provides for an analog-like readout of a DACLC pixel. Using a readout mechanism based on polarization-dependent transmittance coupled with the ability to define the input polarization orientation greatly increases the possible permutations for a given pixel, which is advantageous for data storage, authentication, and cryptography applications.

Figure 17:
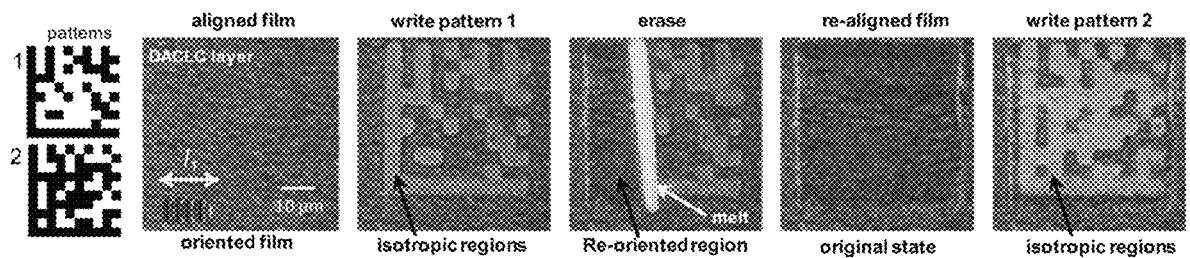
FIG. 17 shows LPL microscopy images that demonstrate writing, erasing, and rewriting of two distinct data matrix barcode patterns into an aligned DACLC layer.

The rewriteable properties of the film are further demonstrated in FIG. 17. Here, a 10×10 data matrix barcode is patterned into an aligned film. Pattern 1 is "flashed" into the film, imprinting the image as regions of isotropic pixels. The image is subsequently erased by scanning a laser line to realign the film with the background, and the second pattern is written into this same location. This laser-directed assembly combined with the self-healing characteristics of DACLCs provide for limitless rewriting. Currently, images appear stable for up to a week, however, side chain substitution can enable tuning of this parameter (i.e., increase or decrease image persistence) [15], For example, by substituting the DAN alkyl chain from hexyl to octyl, we have observed laser-patterned images to persist longer than 3 months.

Figure 18:
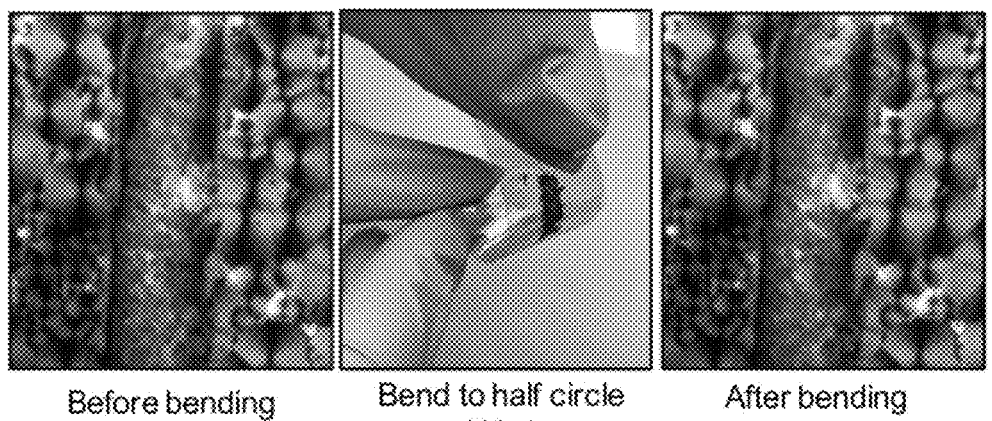
FIG. 18 shows a re-aligned laser line written on a randomly oriented DAN•NDI film on a polyimide substrate before and after bending (10×).
Figure 19:
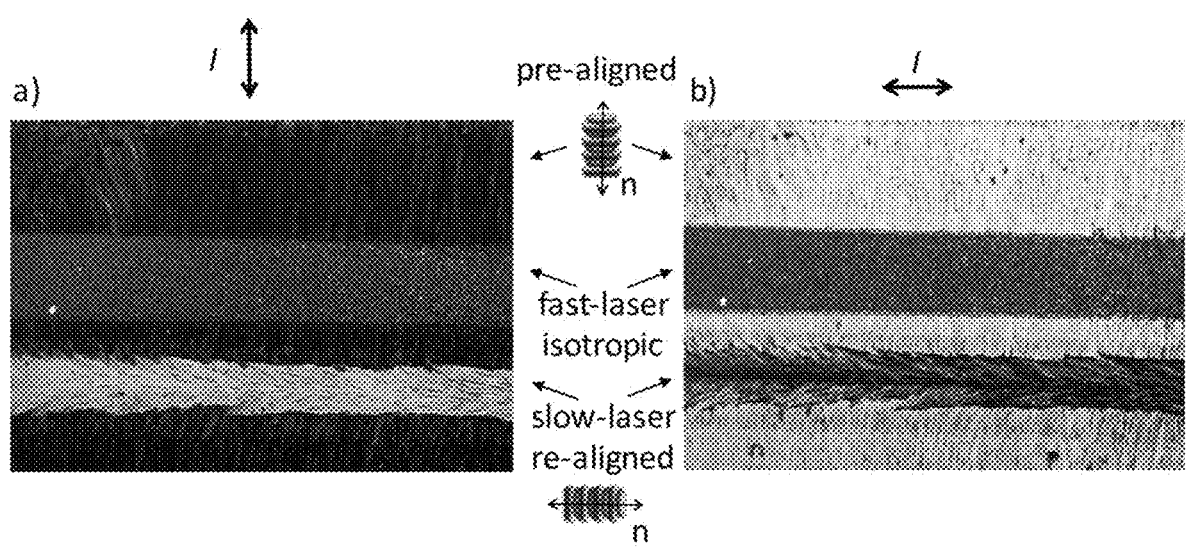
FIG. 19 shows LPL images of a DAN•NDI film written with a 650 nm, 250 mW laser from a commercial DVD burner. The sample region has a Cob director pre-aligned vertically. Provided are images with I oriented (a) parallel and (b) perpendicular to the pre-aligned Cob director.

Overall, we have developed and demonstrated a new class of multifunctional OWR materials through control over the alignment and resultant optical properties in thin films of strongly dichroic and piezoelectric organic CT liquid crystals. By changing the power and rate of laser movement, the magnitude of thermal gradient and the cooling rate of the DACLC are tailored to dictate the degree of order and alignment of the Cob director in the laser path. This allows for complete control over the loss or realignment of the polarization axis for CT absorption in the material on a micrometer scale. Furthermore, the CT absorption can be tuned [6b,7] and thus potentially layered to enable multicolor laser processing of films. The organic OWR system described here is compatible with hard and flexible substrates (FIG. 18), and is amiable to commercial DVD writers (FIG. 19).

In summary, the proposed OWR system is simple in execution and reversible, with the capacity for analog-like readout relevant for data storage and encryption. The patterned films are piezoelectric, and may enable tuning of additional functional properties such as photoconductivity, ferroelectricity, and ambipolar charge conduction-properties of CT cocrystalline materials that are current subjects of considerable investigation [6c,8,16].

REFERENCES

[1] a) Yang Y et al., "Self-healing polymeric materials," Chem. Soc. Rev. 2013; 42:7446-67; b) Blaiszik B J et al., "Self-healing polymers and composites," Annu. Rev. Mater. Res. 2010; 40:179-211.
[2] a) Cai G et al., "Next-generation multifunctional electrochromic devices," Acc. Chem. Res. 2016; 49:1469-76; b) Sonmez G et al., "Organic polymeric electrochromic devices: polychromism with very high coloration efficiency," Chem. Mater. 2004; 16:574-80.
[3] a) Morita Y et al., "Thermochromism in an organic crystal based on the coexistence of σ- and π-dimers," Nat. Mater. 2008; 7:48-51; b) Lampert C M, "Chromogenic smart materials," Mater. Today 2004; 7:28-35.
[4] a) Montelongo Y et al., "Reconfigurable optical assembly of nanostructures," Nat. Commun. 2016; 7:12002 (8 pp.); b) Zheng Z G et al., "Light-patterned crystallographic direction of a self-organized 3D soft photonic crystal," Adv. Mater. 2017; 29:1703165 (8 pp.); c) Srivastava A K et al., "Photoaligned nanorod enhancement films with polarized emission for liquid-crystal-display application," Adv. Mater. 2017; 29:1701091 (6 pp.); d) Wang W et al., "Photocatalytic colour switching of redox dyes for ink-free light-printable rewritable paper," Nat. Commun. 2014; 5:5459 (7 pp.); e) Garai B et al., "Photochromic metal-organic frameworks for inkless and erasable printing," Chem. Sci. 2016; 7:2195-200.
[5] a) Boles M A et al., "Self-assembly of colloidal nanocrystals: from intricate structures to functional materials," Chem. Rev. 2016; 116:11220-89; b) Wang L et al., "Dynamic nanoparticle assemblies," Acc. Chem. Res. 2012; 45:1916-26; c) Grzelczak M et al., "Directed self-assembly of nanoparticles," ACS Nano 2010; 4:3591-605.
[6] a) Wöhrle T et al., "Discotic liquid crystals," Chem. Rev. 2016; 116:1139-241; b) Be A G et al., "Strongly dichroic organic films via controlled assembly of modular aromatic charge-transfer liquid crystals," Org. Lett. 2015; 17:4834-7; c) Tayi A S et al., "Room-temperature ferroelectricity in supramolecular networks of charge-transfer complexes," Nature 2012; 488:485-9.
[7] Leight K R et al., "Predictable tuning of absorption properties in modular aromatic donor-acceptor liquid crystals," Chem. Mater. 2012; 24:3318-28.
[8] Zhu L et al., "Prediction of remarkable ambipolar charge-transport characteristics in organic mixed-stack charge-transfer crystals," J. Am. Chem. Soc. 2012; 134: 2340-7.
[9] a) Kaafarani B R, "Discotic liquid crystals for optoelectronic applications," Chem. Mater. 2011; 23:378-96; b) Kumar S, "Chemistry of Discotic Liquid Crystals: From Monomer to Polymers," (ed. V. Percec), CRC Press (Boca Raton, Fla.), 2011, pp. 29-42.
[10] a) Bisoyi H K et al., "Light-driven liquid crystalline materials: from photo-induced phase transitions and property modulations to applications," Chem. Rev. 2016; 116: 15089-166; b) Chigrinov V G, Kozenkov V M, Kwok H S, "Photoalignment of Liquid Crystalline Materials: Physics and Applications," (ed. A. C. Lowe), John Wiley & Sons (West Sussex, UK), 2008, pp. 78-81.
[11] a) Kim S et al., "Electrostatic-free piezoresponse force microscopy," Sci. Rep. 2017; 7:41657 (8 pp.); b) Chen Q N et al., "Mechanisms of electromechanical coupling in strain based scanning probe microscopy," Appl. Phys. Lett. 2014; 104:242907 (4 pp.).
[12] Sarman S et al., "Director alignment relative to the temperature gradient in nematic liquid crystals studied by molecular dynamics simulation," Phys. Chem. Chem. Phys. 2014; 16:14741-9.
[13] Shin J et al., "Thermally functional liquid crystal networks by magnetic field driven molecular orientation," ACS Macro Lett. 2016; 5:955-60.
[14] Nielson R et al., "Microreplication and design of biological architectures using dynamic-mask multiphoton lithography," Small 2009; 5:120-5.
[15] Alvey P M et al., "A systematic study of thermochromic aromatic donor-acceptor materials," J. Org. Chem. 2010; 75:7682-90
[16] a) D'Avino G et al., "Conflicting evidence for ferroelectricity," Nature 2017; 547:E9-E10; b) Qin Y et al., "Efficient ambipolar transport properties in alternate stacking donor-acceptor complexes: from experiment to theory," Phys. Chem. Chem. Phys. 2016; 18:14094-103; c) Su Y et al., "Donor-acceptor cocrystal based on hexakis (alkoxy)triphenylene and perylenediimide derivatives with an ambipolar transporting property," Nanoscale 2015; 7:1944-55.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A method of writing an optical code, the method comprising:
   providing a film comprising a charge-transfer material, wherein the charge-transfer material comprises a plurality of domains and wherein each of the plurality of domains comprises a donor moiety and an acceptor moiety;
   thermally melting the film to provide a first pattern disposed within the film, in which the first pattern comprises a plurality of first regions; and
   optionally erasing by thermally melting the first pattern.

2. The method of claim 1, wherein the thermally melting step comprises masking a portion of the film and exposing the film, thereby providing the first pattern.

3. The method of claim 1, wherein the film comprises an initial aligned columnar phase characterized by an initial columnar director.

4. The method of claim 3, wherein each of the plurality of first regions comprises a first optically anisotropic phase comprising a plurality of aligned domains arranged in an aligned columnar phase characterized by a first columnar director that is different than the initial columnar director, and wherein the thermally melting step provides alignment within the plurality of first regions.

5. The method of claim 4, wherein the thermally melting step comprises exposing the film to a thermal heat source or an optical source.

6. The method of claim 4, wherein the pattern further comprises a plurality of second regions, wherein each of the plurality of second regions comprises a second optically anisotropic phase comprising a plurality of aligned domains arranged in an aligned columnar phase characterized by a second columnar director that is different than the first and the initial columnar directors, and wherein the thermally melting step provides alignment within the plurality of second regions.

7. The method of claim 3, wherein each of the plurality of first regions comprises a first optically isotropic phase comprising a plurality of domains lacking alignment along the initial columnar director, and wherein the thermally melting step provides disorder within the plurality of first regions.

8. The method of claim 7, wherein the thermally melting step comprises exposing the film to a thermal heat source or an optical source.

9. The method of claim 1, wherein the film comprises an initial optically isotropic phase.

10. The method of claim 9, wherein each of the plurality of first regions comprises a first optically anisotropic phase comprising a plurality of aligned domains arranged in an aligned columnar phase characterized by a first columnar director, and wherein the thermally melting step provides alignment within the plurality of first regions.

11. The method of claim 1, wherein the donor moiety comprises a structure of any one of (I), (Ia), (II), (IIa), (III), (IIIa), (IV), (IVa), (V), (Va), (VI), and (VII), or a salt thereof; and wherein the acceptor moiety comprises a structure of any one of (VIII), (IX), (X), (XI), (XII), and (XIII), or a salt thereof.

* * * * *